US012633788B2

(12) United States Patent
Shibayama et al.

(10) Patent No.: US 12,633,788 B2
(45) Date of Patent: May 19, 2026

(54) ROTOR AND MOTOR

(71) Applicant: KAWASAKI JUKOGYO KABUSHIKI KAISHA, Kobe (JP)

(72) Inventors: Yoshiyasu Shibayama, Kobe (JP); Keigo Imamura, Kobe (JP); Kazuki Ueta, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 148 days.

(21) Appl. No.: 18/292,029

(22) PCT Filed: Jun. 13, 2022

(86) PCT No.: PCT/JP2022/023675
§ 371 (c)(1),
(2) Date: Jan. 25, 2024

(87) PCT Pub. No.: WO2023/007968
PCT Pub. Date: Feb. 2, 2023

(65) Prior Publication Data
US 2025/0070604 A1    Feb. 27, 2025

(30) Foreign Application Priority Data

Jul. 30, 2021    (WO) .................. PCT/JP2021/028379

(51) Int. Cl.
*H02K 1/27*        (2022.01)
*H02K 1/276*       (2022.01)

(52) U.S. Cl.
CPC ................................. *H02K 1/2766* (2013.01)

(58) Field of Classification Search
CPC .... H02K 1/2766; H02K 2213/03; H02K 1/27; H02K 1/276
See application file for complete search history.

(56) References Cited

U.S. PATENT DOCUMENTS 6,741,003 B2 *    5/2004   Naito .................... H02K 1/2766
                                                        310/156.56
2003/0066830 A1 *    4/2003   Reed ...................... H05B 6/108
                                                        219/628

(Continued)

FOREIGN PATENT DOCUMENTS

JP     2006-314152 A    11/2006
JP     2019-041530 A    3/2019
WO     2015/104956 A1   7/2015

OTHER PUBLICATIONS

Jul. 12, 2022 International Search Report issued in International Patent Application No. PCT/JP2022/023675.

*Primary Examiner* — Thomas Truong
(74) *Attorney, Agent, or Firm* — Oliff PLC

(57)        ABSTRACT

A rotor includes a rotor body rotatable about a rotation axis and magnetic pole portions arranged in the rotor body. Each magnetic pole portion includes first and second magnets, the second being inside the first in a radial direction centered on the rotation axis. The rotor body includes first and second mount holes in each of which the first and second magnets is to be respectively located. The rotor body has division walls each of which divides the second mount hole. The first mount hole is one undivided hole. When the intersection of the outer peripheral surface of the rotor body with the d-axis of each magnetic pole portion is taken as a reference point, the dimension of a portion of the first magnet positioned between the reference point and the division wall in a magnetization direction is greater than the dimension of other portions of the first magnet.

8 Claims, 8 Drawing Sheets

(56) References Cited

U.S. PATENT DOCUMENTS

2013/0147303 A1* 6/2013 Kaiser .................. H02K 1/2766
310/156.38
2016/0380492 A1* 12/2016 Kawasaki ............ H02K 1/2766
310/156.11

* cited by examiner

ROTOR AND MOTOR

FIELD

The technique disclosed herein relates to a rotor and a motor.

BACKGROUND

Patent Document 1 discloses a motor. The motor includes a rotor and a stator. The rotor is of an embedded magnet type, and includes a rotor core and magnetic pole portions disposed in the rotor core. Each magnetic pole portion has two magnets aligned in the radial direction of the rotor core.

CITATION LIST

Patent Document

Patent Document 1: Japanese Unexamined Patent Application Publication No. 2019-41530

SUMMARY OF THE INVENTION

In the rotor disclosed in Patent Document 1, there is a high probability of causing irreversible demagnetization of the magnetic pole portion due to a diamagnetic field, such as a rotating magnetic field, generated by the stator.

The technique disclosed herein has been made in view of such a point, and an object thereof is to ensure motor torque while irreversible demagnetization of a magnetic pole portion is reduced.

A rotor disclosed herein includes a rotor body rotatable about a rotation axis, and magnetic pole portions arranged in a circumferential direction centered on the rotation axis in the rotor body and having different magnetic poles alternately in the circumferential direction. Each magnetic pole portion includes a first magnet and a second magnet located inside the first magnet in a radial direction centered on the rotation axis. The rotor body includes a first mount hole in which the first magnet is to be located and a second mount hole in which the second magnet is to be located. The rotor body has a division wall dividing the second mount hole so as to couple a portion of the rotor body positioned on the first magnet side with respect to the second mount hole and a portion of the rotor body positioned on the opposite side of the second mount hole from the first magnet to each other. The first mount hole is one undivided hole. When the intersection of the outer peripheral surface of the rotor body with the d-axis of each magnetic pole portion is taken as a reference point, the dimension of a portion of the first magnet positioned between the reference point and the division wall in a magnetization direction is greater than the dimension of other portions of the first magnet in the magnetization direction.

A motor disclosed herein includes the rotor and a stator that drives the rotor.

The rotor can ensure motor torque while reducing irreversible demagnetization of the magnetic pole portion.

The motor can ensure torque while reducing irreversible demagnetization of the magnetic pole portion.

DESCRIPTION OF EMBODIMENTS

Figure 1:
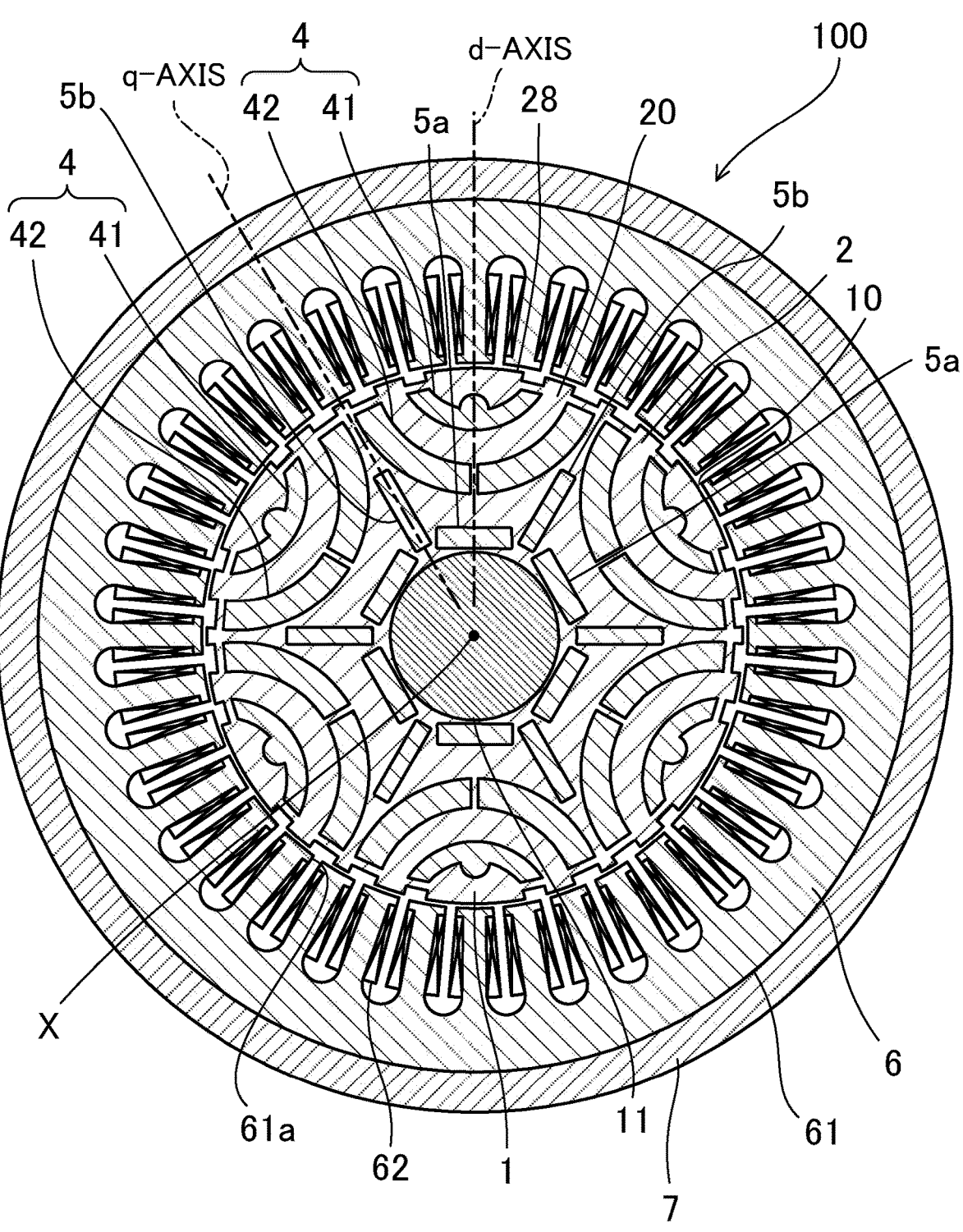
FIG. 1 is a sectional view of a motor.

Hereinafter, an exemplary embodiment will be described in detail with reference to the drawings. FIG. 1 shows a motor 100 according to the embodiment. The motor 100 includes a rotor 1 that rotates about a predetermined rotation axis X and a stator 6 that rotates the rotor 1 about the rotation axis X. A permanent magnet is embedded in the rotor 1. That is, the motor 100 is an interior permanent magnet (IPM) motor. The motor 100 may further include a motor case 7. The motor case 7 houses the rotor 1 and the stator 6. The stator 6 is fixed to the motor case 7. The rotor 1 is rotatably supported by the motor case 7.

Hereinafter, a direction in which the rotation axis X extends will be referred to as a "rotation axis direction." A circumferential direction centered on the rotation axis X will be merely referred to as a "circumferential direction." A radial direction centered on the rotation axis X will be merely referred to as a "radial direction." A side closer to the rotation axis X in the radial direction will be referred to as a "radial inside." A side opposite to the rotation axis X will be referred to as a "radial outside." A section perpendicular to the rotation axis X will be referred to as a "perpendicular section." The shape of each element of the motor 100 in the perpendicular section will be merely referred to as a "sectional shape."

The stator 6 includes a stator core 61 and a winding 62. The stator core 61 is a soft magnetic material. The stator core 61 includes, for example, electromagnetic steel sheets stacked on each other.

The stator core 61 is in an annular shape. Specifically, the stator core 61 is in a cylindrical shape. The stator core 61 is fixed to the motor case 7. The stator core 61 includes teeth 61a protruding inward of the stator core 61. The teeth 61a are aligned at intervals in the circumferential direction at the stator core 61. The winding 62 is wound around the teeth 61a. The stator 6 generates a rotating magnetic field for rotating the rotor 1 in such a manner that the winding 62 is supplied with current.

The rotor 1 includes a rotor body 2 that rotates about the rotation axis X and magnetic pole portions 4 arranged in the circumferential direction in the rotor body 2 and having different magnetic poles alternately in the circumferential direction. In this example, the rotor 1 includes six magnetic pole portions 4 arranged at equal intervals in the circumferential direction. The rotor 1 may further include auxiliary magnets 5a, 5b in addition to the magnetic pole portions 4. In this example, the rotor 1 includes six auxiliary magnets 5a and six auxiliary magnets 5b.

At least part of the rotor body 2 is made of a soft magnetic material. The rotor body 2 has magnetic saliency. The rotor body 2 generates reluctance torque in the rotating magnetic field generated by the stator 6. The rotor body 2 includes a rotor core 20 and a shaft 5.

The rotor core 20 is a soft magnetic material. The rotor core 20 includes, for example, electromagnetic steel sheets stacked on each other. The rotor core 20 is in an annular shape surrounding the rotation axis X. Specifically, the rotor core 20 is in a cylindrical shape concentric with the stator core 61. The outer peripheral surface 28 of the rotor core 20 defines the outer peripheral surface of the rotor body 2. The sectional shape of the rotor core 20 is the same across the entire length of the rotor core 20 in the rotation axis direction. There is an air gap 10 between the outer peripheral surface 28 of the rotor core 20 and the inner peripheral surface of the stator core 61.

A shaft 11 is fitted in the rotor core 20. The shaft 11 is fixed to the rotor core 20. The center of the shaft 11 is coincident with the rotation axis X. The shaft 11 is rotatably supported by the motor case 7 through, e.g., a bearing. The rotor core 20 rotates about the rotation axis X together with the shaft 11. The shaft 11 is a soft magnetic material.

The magnetic pole portions 4 are disposed in the rotor core 20. The magnetic pole portions 4 generate magnet torque in the rotating magnetic field generated by the stator 6. The magnetic pole portions 4 are located at equal intervals in the circumferential direction.

Figure 2:
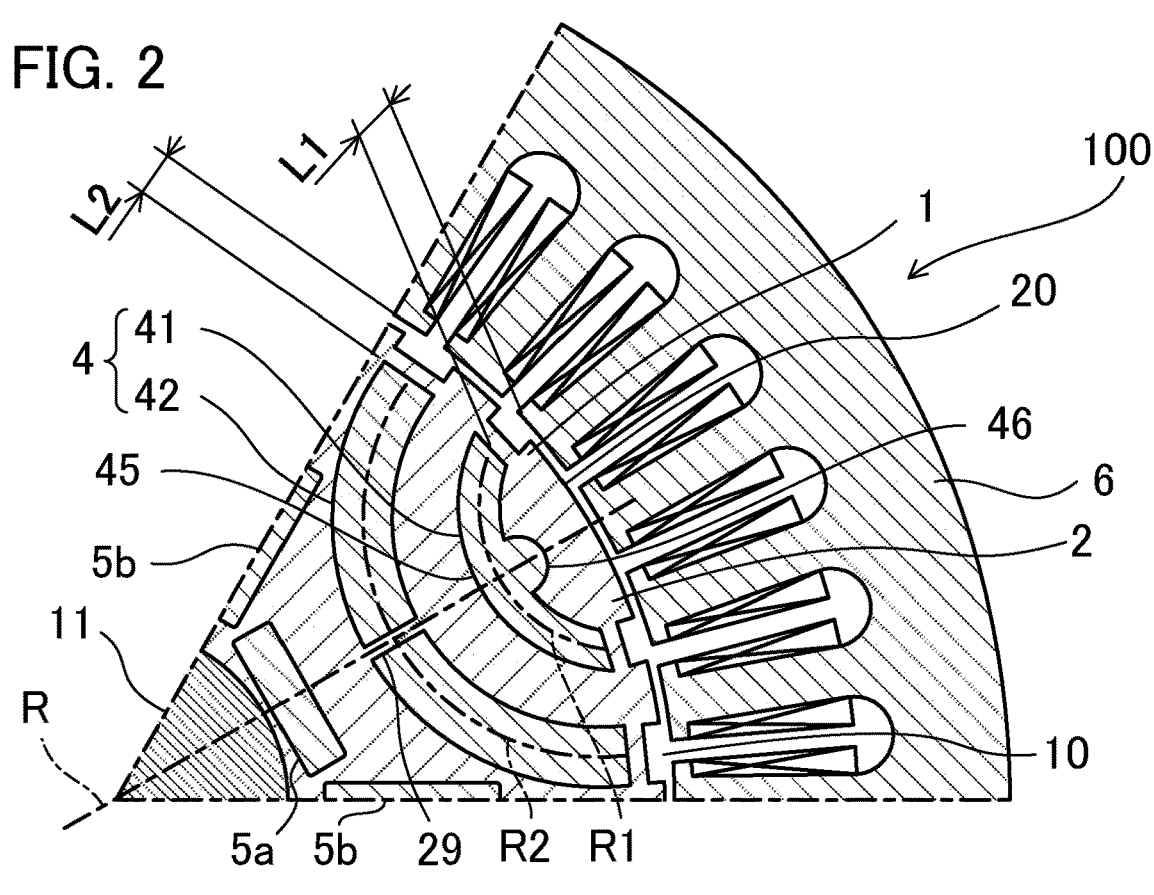
FIG. 2 is an enlarged sectional view of the motor.
Figure 3:
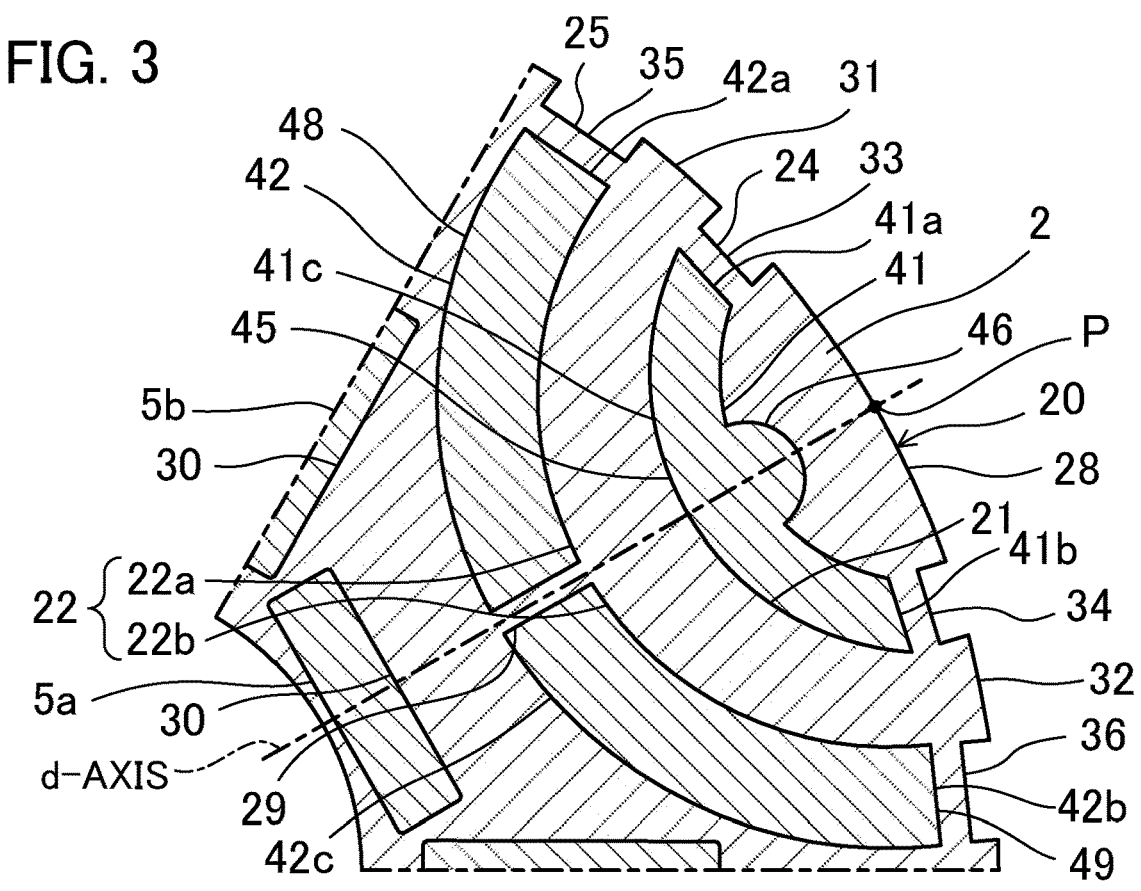
FIG. 3 is an enlarged sectional view of a rotor.

FIG. 2 is an enlarged sectional view of the motor 100. FIG. 3 is an enlarged sectional view of the rotor 1. Each magnetic pole portion 4 of the rotor 1 is in a line-symmetric shape with respect to a symmetrical axis extending in the radial direction. Each magnetic pole portion 4 includes magnets. Specifically, each magnetic pole portion 4 includes two magnets which are a first magnet 41 and a second magnet 42. The first magnet 41 and the second magnet 42 are aligned at an interval in the radial direction. The second magnet 42 is arranged on the radial inside with respect to the first magnet 41. The first magnet 41 and the second magnet 42 are in the form of a layer. That is, the magnetic pole portion 4 has two magnet layers of the first magnet 41 and the second magnet 42.

Each of the first magnet 41 and the second magnet 42 is a bonded magnet. The bonded magnet is made of a magnet material containing magnet powder and a binder for binding the magnet powder. The magnet powder is powder of, e.g., a neodymium magnet, a samarium-iron-nitrogen-based magnet, a samarium-cobalt-based magnet, a ferrite magnet, or an alnico magnet or a mixture of two or more of these types of powder. The binder is, for example, thermosetting resin such as epoxy resin, thermoplastic resin such as polyamide resin, or rubber.

The rotor core 20 includes first mount holes 21 in which the first magnets 41 are to be located and second mount holes 22 in which the second magnets 42 are to be located. Each of the first mount holes 21 and the second mount holes 22 is a hole penetrating the rotor core 20 in the rotation axis direction. The sectional shape 3 of the first mount hole 21 is the same as the sectional shape of the first magnet 41. The sectional shape of the second mount hole 22 is the same as the sectional shape of the second magnet 42.

The first magnets 41 and the second magnets 42 are obtained, for example, by insert molding. Specifically, the first magnets 41 and the second magnets 42 are obtained in such a manner that the magnet material to be the bonded magnets is injected into a mold housing the rotor core 20. The first magnets 41 and the second magnets 42 are cured products of the magnet material charged into the first mount holes 21 and second mount holes 22 of the rotor core 20. The first mount hole 21 is filled with the first magnet 41. The second mount hole 22 is filled with the second magnet 42.

Each of the first magnets 41 and the second magnets 42 are in a plate shape extending along the rotation axis X. The sectional shape of the first magnet 41 is the same across the entire length of the first magnet 41 in the rotation axis direction. The sectional shape of the second magnet 42 is the same across the entire length of the second magnet 42 in the rotation axis direction.

The sectional shape of each of the first magnets 41 and the second magnets 42 is a linear shape. That is, the sectional shape of the first magnet 41 is a shape extending along a predetermined first reference line R1. The sectional shape of the second magnet 42 is a shape extending along a predetermined second reference line R2. Each of the first reference line R1 and the second reference line R2 extends in a direction crossing a predetermined reference line R passing through the rotation axis X and extending in the radial direction. Hereinafter, in the first magnet 41, a direction which is parallel with a plane perpendicular to the rotation axis X and is perpendicular to the first reference line R1 will also be referred to as a "thickness direction." In the second magnet 42, a direction which is parallel with a plane perpendicular to the rotation axis X and is perpendicular to the second reference line R2 will also be referred to as a "thickness direction."

The first magnet 41 has two end portions 41a, 41b in a direction in which the first reference line R1 extends and a middle portion 41c positioned between the two end portions 41a, 41b. Hereinafter, in a case where the two end portions 41a, 41b are distinguished from each other, these end portions will be referred to as a "first end portion 41a" and a "second end portion 41b." The second magnet 42 has two end portions 42a, 42b in a direction in which the second reference line R2 extends and a middle portion 42c positioned between the two end portions 42a, 42b. Hereinafter, in a case where the two end portions 42a, 42b are distinguished from each other, these end portions will be referred to as a "first end portion 42a" and a "second end portion 42b."

Note that the middle portion 41c does not indicate the entirety of a portion of the first magnet 41 other than the two end portions 41a, 41b and indicates at least part of the portion other than the two end portions 41a, 41b. The middle portion 41c may or may not include the center of the first magnet 41 in the direction in which the first reference line R1 extends. The middle portion 42c does not indicate the entirety of a portion of the second magnet 42 other than the two end portions 42a, 42b and indicates at least part of the portion other than the two end portions 42a, 42b. The middle portion 42c may or may not include the center of the second magnet 42 in the direction in which the second reference line R2 extends.

The first magnet 41 is curved or bent so as to be recessed to the radial inside. The middle portion 41c is positioned on the radial inside with respect to the two end portions 41a, 41b. That is, the first magnet 41 is curved or bent such that the two end portions 41a, 41b are closer to the outer peripheral surface 28 of the rotor core 20 than the middle portion 41c is to the outer peripheral surface 28. Specifically, the sectional shape of the first magnet 41 is substantially in a U-shape. That is, the first magnet 41 is in an arc shape curved so as to be recessed to the radial inside. The sectional shape of the first magnet 41 is a line-symmetric shape with respect to a symmetrical axis extending in the radial direction.

Similarly, the second magnet 42 is curved or bent so as to be recessed to the radial inside. The middle portion 42c is positioned on the radial inside with respect to the two end portions 42a, 42b. That is, the second magnet 42 is curved or bent such that the two end portions 42a, 42b are closer to the outer peripheral surface 28 of the rotor core 20 than the middle portion 42c is to the outer peripheral surface 28. Specifically, the sectional shape of the second magnet 42 is substantially in a U-shape. That is, the second magnet 42 is in an arc shape curved so as to be recessed to the radial inside. The sectional shape of the second magnet 42 is a line-symmetric shape with respect to a symmetrical axis extending in the radial direction. The symmetrical axis as the center of the line-symmetric shape of the second magnet 42 is coincident with the symmetrical axis as the center of the line-symmetric shape of the first magnet 41.

Figure 4:
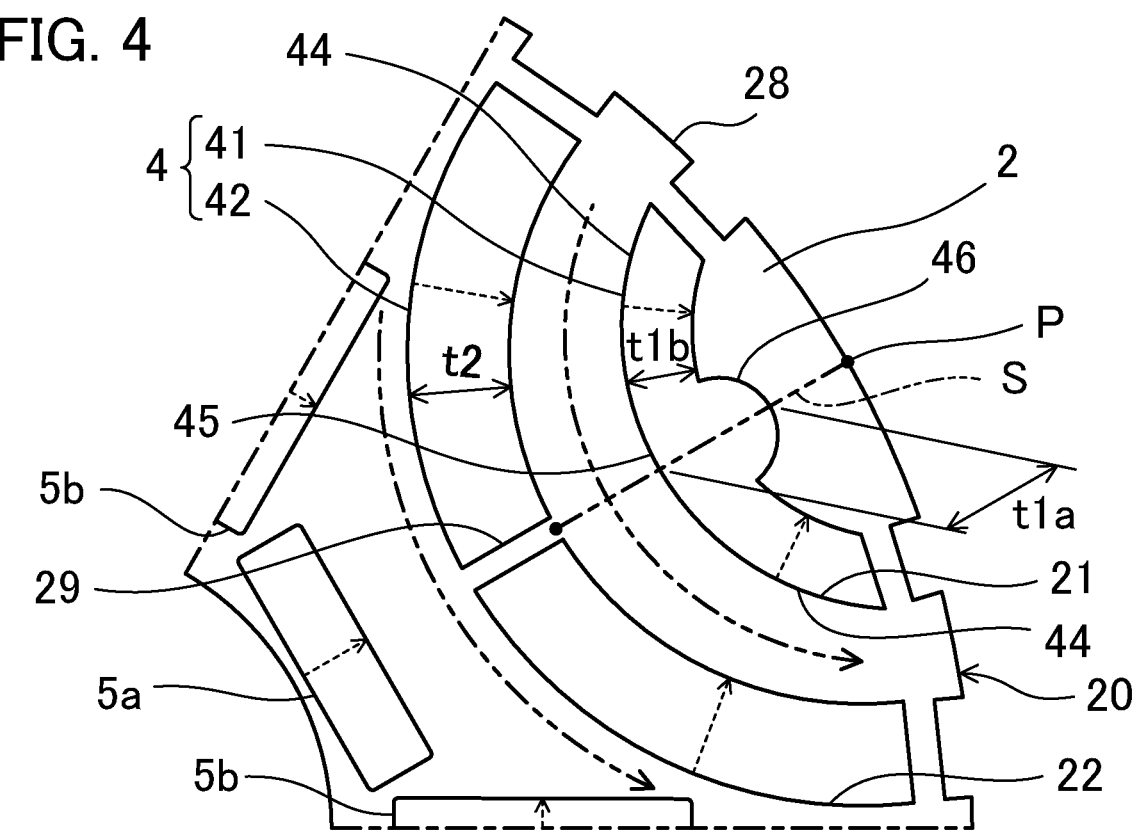
FIG. 4 is an enlarged view for describing the section of the rotor.

FIG. 4 is an enlarged view for describing the section of the rotor 1. Note that in FIG. 4, hatching indicating the section is omitted for the sake of the clarity of lines used for description. The first magnet 41 is magnetized in a direction crossing the first reference line R1. Specifically, the first magnet 41 is magnetized in a direction which is parallel with a plane perpendicular to the rotation axis X and is perpendicular to the first reference line R1, as indicated by dashed arrows in FIG. 4. That is, the magnetization direction of the first magnet 41 is the thickness direction of the first magnet 41. The second magnet 42 is magnetized in a direction crossing the second reference line R2. Specifically, the second magnet 42 is magnetized in a direction which is parallel with a plane perpendicular to the rotation axis X and is perpendicular to the second reference line R2, as indicated by dashed arrows in FIG. 4. That is, the magnetization direction of the second magnet 42 is the thickness direction of the second magnet 42.

The direction of a magnetic flux generated by the magnetic pole portion 4 is determined by a magnetic field generated by the first magnet 41 and a magnetic field generated by the second magnet 42. Specifically, as shown in FIGS. 1 and 3, each magnetic pole portion 4 has a d-axis extending in the direction of the magnetic flux generated by the magnetic pole portion 4 and a q-axis electrically and magnetically perpendicular to the d-axis.

The d-axis is the magnetic pole center line of the magnetic pole portion 4, and extends in the radial direction. In this example, the d-axis and the center axis of the shape of the magnetic pole portion 4 are coincident with each other in the perpendicular section. Specifically, the d-axis is coincident with the symmetrical axis as the center of the line-symmetric shape of the first magnet 41. The d-axis is also coincident with the symmetrical axis as the center of the line-symmetric shape of the second magnet 42.

The q-axis is an axis shifted from the d-axis by an electrical angle of 90 degrees. The q-axis extends in the radial direction, and in the perpendicular section, passes between adjacent ones of the magnetic pole portions 4 in the circumferential direction. In this example, in the perpendicular section, the q-axis passes through the center between adjacent ones of the magnetic pole portions 4 in the circumferential direction.

The first magnet 41 is continuous in the direction in which the first reference line R1 extends. That is, the first magnet 41 is not divided. On the other hand, the second magnet 42 is divided in the middle in the direction in which the second reference line R2 extends.

The rotor core 20 has division walls 29 each of which divides the second mount hole 22. The division wall 29 couples a portion of the rotor core 20 positioned on the first magnet 41 side with respect to the second mount hole 22 and a portion of the rotor core 20 positioned on the opposite side of the second mount hole 22 from the first magnet 41 to each other. In other words, the division wall 29 couples a radial inside portion (i.e., portion opposite to the outer peripheral surface 28) of the second mount hole 22 and a radial outside portion (i.e., portion on the outer peripheral surface 28 side) of the second mount hole 22 to each other.

The division wall 29 is located at a center portion of the second mount hole 22 in the direction in which the second reference line R2 extends. Specifically, the division wall 29 is positioned on the d-axis of the magnetic pole portion 4. The division wall 29 extends in a direction crossing the second reference line R2, specifically a direction perpendicular to the second reference line R2, in the perpendicular section. That is, the division wall 29 extends in the radial direction. The second mount hole 22 is divided, by the division wall 29, into two divided holes 22a, 22b aligned in the direction in which the second reference line R2 extends.

The second magnet 42 is divided, by the division wall 29, into two magnet pieces 48, 49 aligned in the direction in which the second reference line R2 extends. The two magnet pieces 48, 49 are each located in the two divided holes 22a, 22b. The divided holes 22a, 22b are each filled with the magnet pieces 48, 49.

As shown in FIG. 4, in a case where the intersection of the outer peripheral surface 28 of the rotor core 20 with the d-axis of the magnetic pole portion 4 is taken as a reference point P, the dimension t1a of a portion of the first magnet 41 positioned between the reference point P and the division wall 29 in the magnetization direction is greater than the dimension t1b of other portions of the first magnet 41 in the magnetization direction. That is, the first magnet 41 has at least one thin portion 44 and a thick portion 45 having the dimension t1a in the magnetization direction, which is greater than the dimension t1b of the thin portion 44 in the magnetization direction. Specifically, the first magnet 41 has two thin portions 44 separated from each other in the direction in which the first reference line R1 extends and one thick portion 45 positioned between the two thin portions 44.

The two thin portions 44 are positioned on both sides of the first magnet 41 with a virtual line S connecting the reference point P and the division wall 29 therebetween. The dimension t1a of each thin portion 44 in the magnetization direction is constant in the direction in which the first reference line R1 extends. The dimension t1a is also the minimum value of the dimension of the first magnet 41 in the magnetization direction.

The thick portion 45 is positioned at a center portion of the first magnet 41 in the direction in which the first reference line R1 extends. Specifically, a portion of the first magnet 41 crossing the virtual line S includes a protrusion 46 protruding to the reference point P. The protrusion 46 has a semicircular sectional shape. A portion of the first magnet 41 including the protrusion 46 is the thick portion 45. The dimension t1a is the maximum value of the dimension of the thick portion 45 in the magnetization direction. The dimension t1a is also the maximum value of the dimension of the first magnet 41 in the magnetization direction.

The dimension t2 of the second magnet 42 in the magnetization direction is constant in the direction in which the second reference line R2 extends. The dimension t2 is also the minimum value, maximum value, and average of the dimension of the second magnet 42 in the magnetization direction.

The average (i.e., average in the direction of the second reference line R2) of the dimension of the second magnet 42 in the magnetization direction is greater than the average (i.e., average in the direction of the first reference line R1) of the dimension of the first magnet 41 in the magnetization direction. The minimum value (i.e., dimension t2) of the dimension of the second magnet 42 in the magnetization direction is greater than the minimum value (i.e., dimension t1b) of the dimension of the first magnet 41 in the magnetization direction. The volume of the second mount hole 22 is greater than the volume of the first mount hole 21. Thus, the volume of the second magnet 42 is greater than the volume of the first magnet 41, and the mass of the second magnet 42 is greater than the mass of the first magnet 41.

As shown in FIG. 3, the two end portions 41a, 41b of the first magnet 41 and the two end portions 42a, 42b of the second magnet 42 are located close to the outer peripheral surface 28 of the rotor body 2. That is, the two end portions 41a, 41b of the first magnet 41 and the two end portions 42a, 42b of the second magnet 42 are located so as to face the outer peripheral surface 28 from the radial inside. The two end portions 41a, 41b of the first magnet 41 are located between the two end portions 42a, 42b of the second magnet 42 in the circumferential direction.

The rotor core 20 includes cutouts 24 at portions positioned on the radial outside with respect to the two end portions 41a, 41b of the first magnets 41. The rotor core 20 includes cutouts 25 at portions positioned on the radial outside with respect to the two end portions 42a, 42b of the second magnets 42. The cutouts 24, 25 are formed in the outer peripheral surface 28 of the rotor core 20. The cutouts 24, 25 are opened to the radial outside in the rotor core 20. The cutouts 24, 25 extend across the entire length of the rotor core 20 in the rotation axis direction.

The sectional shape of the cutout 24, 25 is, for example, a rectangular shape. Since the rotor core 20 includes the cutouts 24 in the outer peripheral surface 28, the two end portions 41a, 41b of the first magnets 41 are positioned apart from the outer peripheral surface 28 of the rotor body 2 to the radial inside. Since the rotor core 20 includes the cutouts 25 in the outer peripheral surface 28, the two end portions 42a, 42b of the second magnets 42 are positioned apart from the outer peripheral surface 28 of the rotor core 20 to the radial inside. The rotor core 20 has portions 33, 34 positioned on the radial outside with respect to the two end portions 41a, 41b of the first magnets 41. The rotor core 20 has portions 35, 36 positioned on the radial outside with respect to the two end portions 42a, 42b of the second magnets 42.

The first end portion 41a of the first magnet 41 and the first end portion 42a of the second magnet 42 are adjacent to each other in the circumferential direction. The second end portion 41b of the first magnet 41 and the second end portion 42b of the second magnet 42 are adjacent to each other in the circumferential direction. Each portion 31 of the rotor core 20 between the first end portion 41a and the first end portion 42a protrudes to the radial outside with respect to the portions 33, 34, 35, 36 of the rotor core 20. Each portion 32 of the rotor core 20 between the second end portion 41b and the second end portion 42b protrudes to the radial outside with respect to the portions 33, 34, 35, 36 of the rotor core 20. In this example, each portion of the rotor core 20 between the cutout 24 and the cutout 25 is a protrusion protruding to the radial outside.

As shown in FIG. 1, the auxiliary magnets 5a are arranged in the circumferential direction in the rotor body 2. One auxiliary magnet 5a is disposed for each magnetic pole portion 4. Each auxiliary magnet 5a is located inside the second magnet 42 of the corresponding magnetic pole portion 4 in the radial direction. Specifically, the auxiliary magnet 5a is located between the division wall 29 and the rotation axis X. Each auxiliary magnet 5a is located on the d-axis of the corresponding magnetic pole portion 4.

The auxiliary magnets 5b are arranged in the circumferential direction in the rotor body 2. Each auxiliary magnet 5b is located between the second magnets 42 of adjacent ones of the magnetic pole portions 4 in the circumferential direction. That is, the auxiliary magnet 5b is an interpole magnet located between adjacent ones of the magnetic pole portions 4. Specifically, the auxiliary magnet 5b is located on the q-axis of the magnetic pole portion 4. The auxiliary magnet 5a is located between adjacent ones of the auxiliary magnets 5b in the circumferential direction. The auxiliary magnet 5a and the auxiliary magnet 5b are separated from each other in the circumferential direction.

The auxiliary magnets 5a, 5b are bonded magnets. The auxiliary magnets 5a, 5b are made of the same material as those of the first magnet 41 and the second magnet 42, for example.

As shown in FIG. 3, the rotor core 20 includes mount holes 30 in which the auxiliary magnets 5a, 5b are to be located. The mount hole 30 penetrates the rotor core 20 in the rotation axis direction. The sectional shape of the mount hole 30 is the same as the sectional shape of the auxiliary magnet 5a, 5b.

The auxiliary magnets 5a, 5b are obtained by insert molding as in the first magnet 41 and the second magnet 42, for example. That is, the auxiliary magnets 5a, 5b are obtained in such a manner that the magnet material to be the bonded magnets is injected into the mold housing the rotor core 20. The auxiliary magnets 5a, 5b are cured products of the magnet material charged into the mount holes 30 of the rotor core 20. The mount holes 30 are filled with the auxiliary magnets 5a, 5b.

The sectional shape of the auxiliary magnet 5a is the same across the entire length of the auxiliary magnet 5a in the rotation axis direction. The sectional shape of the auxiliary magnet 5a is a shape extending in a direction crossing the radial direction. Specifically, the sectional shape of the auxiliary magnet 5a is a rectangular shape having a longitudinal direction crossing the radial direction. The entirety of the auxiliary magnet 5a is located on the radial inside with respect to the second magnet 42. The auxiliary magnet 5a is magnetized in a direction crossing the circumferential direction, i.e., a direction crossing the longitudinal direction of the auxiliary magnet 5a. Specifically, the auxiliary magnet 5a is magnetized in the radial direction as indicated by a dashed arrow in FIG. 4.

The sectional shape of the auxiliary magnet 5b is the same across the entire length of the auxiliary magnet 5b in the rotation axis direction. The sectional shape of the auxiliary magnet 5b is a shape extending in a direction crossing the circumferential direction. Specifically, the sectional shape of the auxiliary magnet 5b is a rectangular shape having a longitudinal direction coincident with the radial direction.

Part of the auxiliary magnet 5*b* is located inside the second magnet 42 in the radial direction. Note that the auxiliary magnet 5*b* does not necessarily have a portion positioned inside the second magnet 42 in the radial direction. That is, the entirety of the auxiliary magnet 5*b* may be located between the second magnets 42 of adjacent ones of the magnetic pole portions 4 in the circumferential direction. The auxiliary magnet 5*b* is magnetized in a direction crossing the radial direction, i.e., a direction crossing the longitudinal direction of the auxiliary magnet 5*b*. Specifically, the auxiliary magnet 5*b* is magnetized in the circumferential direction as indicated by a dashed arrow in FIG. 4.

Magnetic fluxes of the auxiliary magnets 5*a*, 5*b* pass through the portion of the rotor core 20 positioned on the first magnet 41 side with respect to the second mount hole 22, the division wall 29, and the portion of the rotor core 20 positioned on the opposite side of the second mount hole 22 from the first magnet 41. That is, the auxiliary magnets 5*a*, 5*b* are magnetized such that the amount of magnetic fluxes passing through the division wall 29 increases.

When the rotating magnetic field is generated in such a manner that the winding 62 of the stator 6 is supplied with current, the magnet torque is generated by the magnetic pole portions 4 and the auxiliary magnets 5*a*, 5*b*, and the reluctance torque is generated by the rotor body 2. The rotor 1 rotates about the rotation axis X by the magnet torque and the reluctance torque. In this case, each magnetic pole portion 4 includes the magnets aligned in the radial direction, and the magnetic fluxes of the stator 6 pass between the magnets. Thus, the reluctance torque is easily obtainable as compared to a case where the magnetic pole portion 4 includes one magnet.

In the rotor 1 having the above-described configuration, the rotor body 2 includes the division walls 29 each of which divides the second mount hole 22. The magnetic permeability of the division wall 29 is higher than the magnetic permeability of the second magnet 42. Thus, the magnetic fluxes of the stator 6 are more likely to pass through the division walls 29, and are less likely to pass through the second magnets 42. Thus, demagnetization of the second magnets 42 caused by a diamagnetic field due to the magnetic fluxes of the stator 6 can be prevented.

It is assumed that the rotor body 2 includes no division walls 29 and each second magnet 42 is one undivided magnet. In this case, the magnet fluxes passing through the first magnets 41 among the magnetic fluxes of the stator 6 also pass through the second magnets 42, and therefore, magnetic resistance against these magnetic fluxes is high. For this reason, the magnetic fluxes of the stator 6 are less likely to pass through the first magnets 41, and demagnetization of the first magnets 41 caused by the diamagnetic field due to the magnetic fluxes of the stator 6 is less likely to occur. On the other hand, the magnetic fluxes of the stator 6 also pass through each portion of the rotor body 2 between the first magnet 41 and the second magnet 42. The magnetic fluxes of the stator 6 passing through these portions pass only through the second magnets 42 without passing through the first magnets 41. For this reason, magnetic resistance against the magnetic fluxes of the stator 6 passing through the second magnets 42 is low. That is, in a case where no division walls 29 are disposed, the magnetic fluxes of the stator 6 are more likely to pass through the second magnets 42 than the first magnets 41, and demagnetization of the second magnets 42 caused by the diamagnetic field due to the magnetic fluxes of the stator 6 is more likely to occur as compared to the first magnets 41. For this reason, it is particularly effective in reducing demagnetization of the magnetic pole portion 4, which has the first magnet 41 and the second magnet 42, caused by the diamagnetic field to reduce, by the division wall 29, demagnetization of the second magnet 42 caused by the diamagnetic field.

The division wall 29 prevents demagnetization of the second magnet 42 caused by the diamagnetic field as described above, but in a case where the division wall 29 is disposed on the radial inside with respect to the first magnet 41, the magnetic fluxes of the stator 6 passing through the division wall 29 are more likely to pass through the first magnet 41. Particularly, the magnetic fluxes of the stator 6 are concentrated on the reference point P of the outer peripheral surface 28 of the rotor core 20 crossing the d-axis of the magnetic pole portion 4, and for this reason, the magnetic fluxes of the stator 6 passing through the division wall 29 are more likely to pass through the portion of the first magnet 41 between the reference point P and the division wall 29. However, in the rotor 1 of the present disclosure, the dimension of the portion of the first magnet 41 between the reference point P and the division wall 29 in the magnetization direction is greater than the dimension of the other portions of the first magnet 41 in the magnetization direction. Thus, the permeance modulus of the portion of the first magnet 41 between the reference point P and the division wall 29 can be enhanced. Consequently, demagnetization of the first magnet 41 caused by the diamagnetic field due to the magnetic fluxes passing through the division wall 29 can be prevented.

The first mount hole 21 in which the first magnet 41 is to be located is one undivided hole. Thus, the magnet amount of the first magnet 41 is increased so that the magnet torque can be improved and therefore the torque of the motor 100 can be improved. That is, the division wall 29 is disposed only in the second mount hole 22 of the first mount hole 21 and the second mount hole 22 and the first magnet 41 includes the thick portion 45, so that the torque of the motor 100 can be ensured and demagnetization of the magnetic pole portion 4 caused by the diamagnetic field can be reduced.

Specifically, the portion of the first magnet 41 positioned between the reference point P and the division wall 29 includes the protrusion 46, and the thick portion 45 is the portion of the first magnet 41 including the protrusion 46. Thus, only a portion of the first magnet 41 through which the magnetic fluxes passing through the division wall 29 are particularly likely to pass can be a portion with a great dimension in the magnetization direction. Consequently, an increase in the magnet amount of the first magnet 41 can be suppressed while demagnetization of the first magnet 41 caused by the diamagnetic field is prevented.

The division wall 29 couples the portion of the rotor body 2 positioned on the first magnet 41 side with respect to the second mount hole 22 and the portion of the rotor body 2 positioned on the opposite side of the second mount hole 22 from the first magnet 41 to each other. Thus, the strength of the rotor core 20 can be improved against centrifugal force acting on the magnetic pole portion 4 at the time of rotation of the rotor 1. Particularly, in a case where the mass of the second magnet 42 is greater than the mass of the first magnet 41, great centrifugal force acts on the second magnet 42, but the division wall 29 can properly improve the strength of the rotor core 20 against centrifugal force acting on the second magnet 42.

The second mount hole 22 in which the second magnet 42 is to be located is divided by the division wall 29 so that the volume of the second magnet 42 to be located in the second mount hole 22 can be decreased and the mass of the second magnet 42 can be decreased. Thus, the centrifugal force acting on the second magnet 42 can be decreased.

The average (i.e., dimension t2) of the dimension of the second magnet 42 in the magnetization direction is greater than the average of the dimension of the first magnet 41 in the magnetization direction. Thus, the permeance modulus of the second magnet 42 can be increased, and irreversible demagnetization of the second magnet 42 can be reduced. That is, the magnetic permeability of a magnet is substantially the same as the magnetic permeability of air. The first magnet 41 is taken as an air gap when the first magnet 41 is positioned in a magnetic circuit generated by the second magnet 42, and the permeance modulus of the second magnet 42 tends to be low. However, the dimension of the second magnet 42 in the magnetization direction is greater so that the permeance modulus of the second magnet 42 can be increased and irreversible demagnetization of the second magnet 42 can be reduced. In addition, the average of the dimension of the first magnet 41 in the magnetization direction is less than the average of the dimension of the second magnet 42 in the magnetization direction so that the volume of the rotor body 2 can be increased and the reluctance torque generated by the rotor body 2 can be improved. The magnetic fluxes of the auxiliary magnets 5a, 5b passing through the division wall 29 contribute to generation of the magnet torque, and therefore, the magnet torque is easily obtainable as compared to a rotor with no auxiliary magnets 5a, 5b. Thus, the torque of the motor 100 can be further improved. Further, the auxiliary magnet 5b is located between the second magnets 42 of adjacent ones of the magnetic pole portions 4 in the circumferential direction. Thus, the auxiliary magnet 5b can be disposed using each space of the rotor body 2 between adjacent ones of the second magnets 42 in the circumferential direction, and an increase in the size of the rotor 1 due to the auxiliary magnets 5b can be suppressed.

As indicated by chain double-dashed arrows in FIG. 4, q-axis magnetic fluxes contributing to the reluctance torque among the magnetic fluxes of the stator 6 flow between the first magnet 41 and the second magnet 42, and also flow along the edge of the second magnet 42 on the side opposite to the first magnet 41. If the auxiliary magnets 5a, 5b with high magnetic resistance are located at positions through which the q-axis magnetic fluxes pass, a q-axis inductance decreases, and the reluctance torque decreases accordingly. However, in this example, the auxiliary magnet 5a is located on the radial inside with respect to the second magnet 42, and the q-axis magnetic fluxes are less likely to pass therethrough. Moreover, part of the auxiliary magnet 5b is located on the radial inside with respect to the second magnet 42, and the auxiliary magnet 5b has less portion through which the q-axis magnetic fluxes pass. Thus, the q-axis inductance is less likely to decrease, and therefore, the reluctance torque can be improved.

In a rotor as disclosed in Patent Document 1, magnetic fluxes (i.e., magnetic fluxes in a direction opposite to that of magnetic fluxes generated by a magnet) generated by a stator pass through the radial outside with respect to an end portion of the magnet in the perpendicular section of a rotor core, and due to these magnetic fluxes, demagnetization of the end portion of the magnet caused by a diamagnetic field may occur. On the other hand, in the rotor 1 of this example, the rotor body 2 includes the cutouts 24, 25 at the portions 33, 34 positioned on the radial outside with respect to the two end portions 41a, 41b of each first magnet 41 and the portions 35, 36 positioned on the radial outside with respect to the two end portions 42a, 42b of each second magnet 42.

Thus, a distance L1 from the end portion 41a, 41b of the first magnet 41 to the stator 6 and a distance L2 from the end portion 42a, 42b of the second magnet 42 to the stator 6 can be increased. Consequently, demagnetization of each of the first and second magnets 41, 42 caused by the diamagnetic field due to the stator 6 can be reduced.

The cutouts 24, 25 increase magnetic resistance in regions outside the two end portions 41a, 41b of the first magnet 41 and the two end portions 42a, 42b of the second magnet 42. Thus, the magnetic fluxes generated by the stator 6 are less likely to pass through each region outside the end portions 41a, 41b, 42a, 42b of the first magnet 41 and the second magnet 42. Consequently, demagnetization of each of the first and second magnets 41, 42 caused by the diamagnetic field can be reduced. If the rotor body 2 is not present in each region outside the end portions 41a, 41b, 42a, 42b of the first magnet 41 and the second magnet 42, the air gap 10 between the rotor core 20 and the inner peripheral surface of the stator core 61 is increased in size, and the magnetic fluxes generated by the stator 6 are less likely to flow to the rotor 1. However, in this example, the portions 33, 34 of the rotor body 2 are positioned on the radial outside with respect to the two end portions 41a, 41b of each first magnet 41, and the portions 35, 36 of the rotor body 2 are positioned on the radial outside with respect to the two end portions 42a, 42b of each second magnet 42. Thus, the air gap 10 between the rotor core 20 and the inner peripheral surface of the stator core 61 can be decreased in size, and the magnetic fluxes generated by the stator 6 are more likely to flow to the rotor 1. Consequently, the torque of the motor 100 can be efficiently generated.

Note that in order to reduce demagnetization of each of the first and second magnets 41, 42 caused by the diamagnetic field, the first mount hole 21 and the second mount hole 22 may have sizes greater than those of the first magnet 41 and the second magnet 42 and part of the first mount hole 21 and the second mount hole 22 may be air gaps adjacent to the end portions 41a, 41b of the first magnet 41 and air gaps adjacent to the end portions of the second magnet 42. Note that in a case where the first magnet 41 and the second magnet 42 are the bonded magnets obtained in such a manner that the first mount hole 21 and the second mount hole 22 are filled with the magnet material, the bonded magnets are disposed across the entirety of the first mount hole 21 and the second mount hole 22, and for this reason, it is difficult to obtain the above-described air gaps. Thus, in a case where the first magnet 41 and the second magnet 42 are the bonded magnets, the rotor body 2 preferably includes the cutouts 24, 25.

Each portion 31, 32 between the end portion 41a, 41b of the first magnet 41 and the end portion 42a, 42b of the second magnet 42 protrudes to the radial outside with respect to the portions 33, 34 of the rotor body 2 on the radial outside with respect to the two end portions 41a, 41b of each first magnet 41 and the portions 35, 36 of the rotor body 2 on the radial outside with respect to the two end portions 42a, 42b of each second magnet 42. Thus, the air gap 10 between the portion 31, 32 and the stator core 61 can be decreased in size, and the torque of the motor 100 can be more efficiently generated.

Each of the first magnets 41 and the second magnets 42 is the bonded magnet. The bonded magnet can be molded as in resin, and has a higher degree of freedom in shape as compared to a sintered magnet. Thus, each of the first magnets 41 and the second magnets 42 is easily moldable in a desired shape.

Subsequently, motors 100A to 100K of first to eleventh modifications will be described. Basic configurations of the motors 100A to 100K are the same as that of the motor 100. Thus, differences of the motors 100A to 100K from the motor 100 will be mainly described hereinafter.

Figure 5:
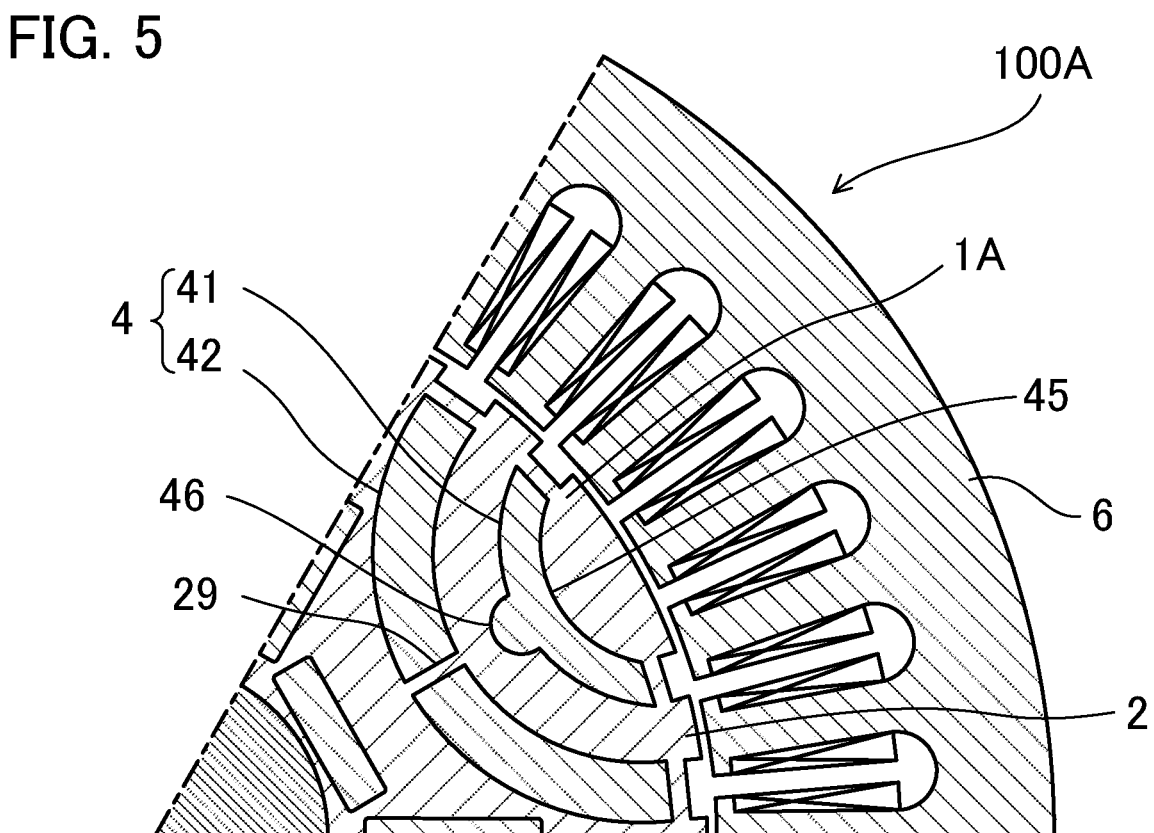
FIG. 5 is an enlarged sectional view of a motor of a first modification.

FIG. 5 is a sectional view of the motor 100A including a rotor 1A in the first modification. In this example, the protrusion 46 of the rotor 1A protrudes to the division wall 29.

Figure 6:
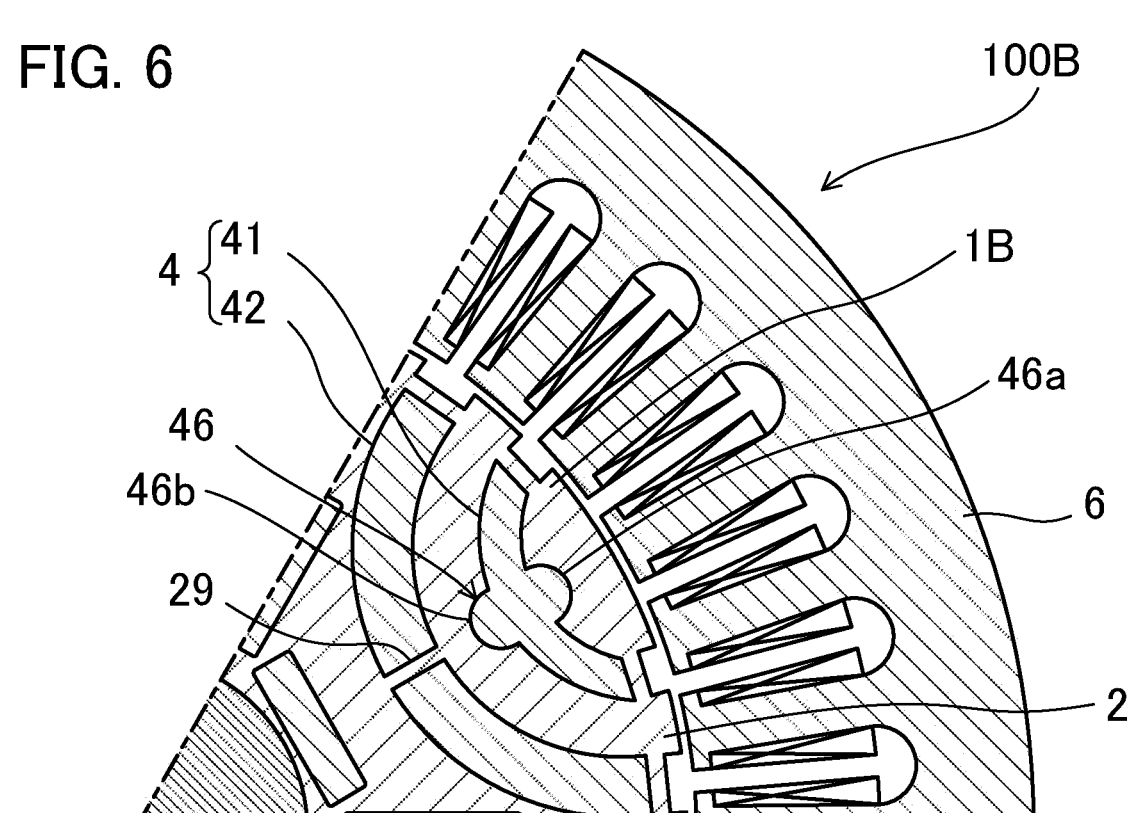
FIG. 6 is an enlarged sectional view of a motor of a second modification.

FIG. 6 is a sectional view of the motor 100B including a rotor 1B in the second modification. In this example, the protrusion 46 includes an outward protrusion 46a protruding to the reference point P and an inward protrusion 46b protruding to the division wall 29.

Figure 7:
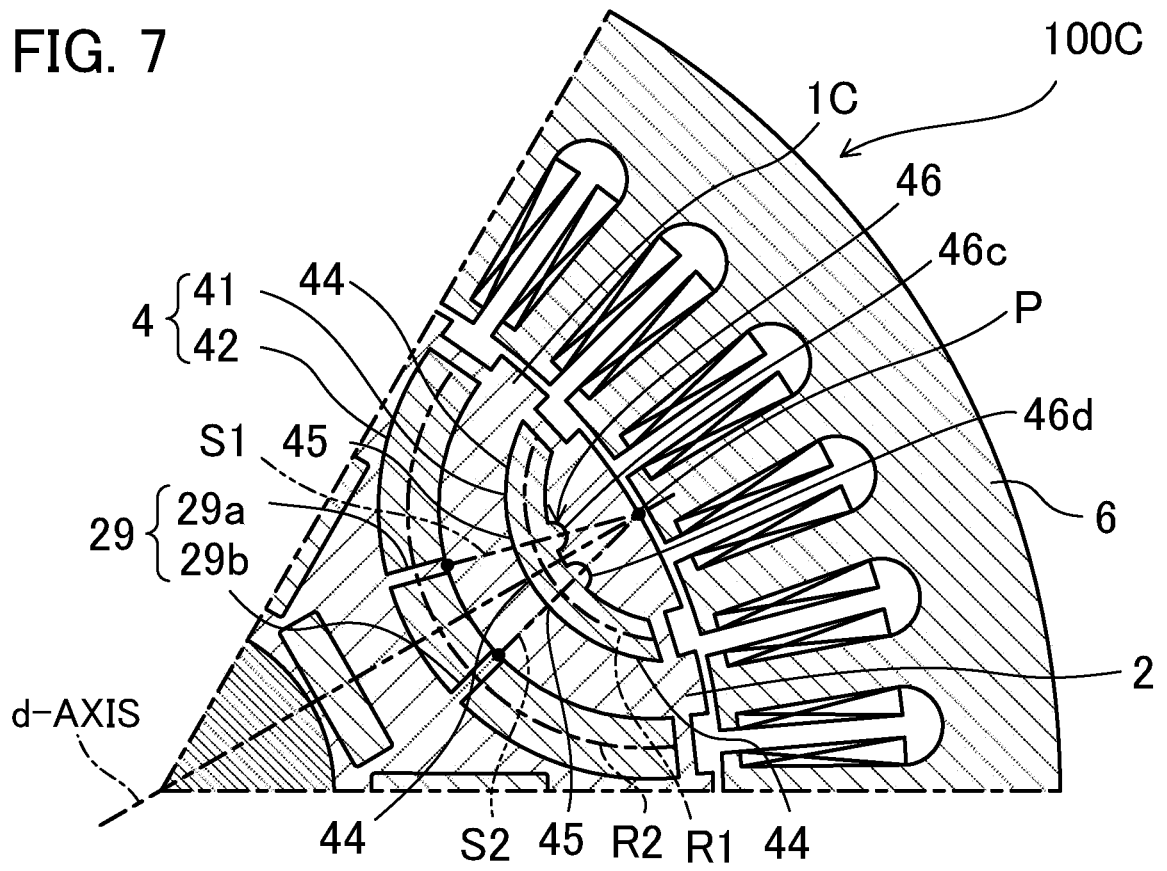
FIG. 7 is an enlarged sectional view of a motor of a third modification.

FIG. 7 is a sectional view of the motor 100C including a rotor 1C in the third modification. In this example, the division wall 29 has a first division wall 29a and a second division wall 29b separated from each other in the direction in which the second reference line R2 extends.

The first division wall 29a and the second division wall 29b are located apart from each other with the d-axis therebetween in the direction in which the second reference line R2 extends. Each of the first division wall 29a and the second division wall 29b extends in a direction crossing the second reference line R2. Specifically, each of the first division wall 29a and the second division wall 29b extends in a direction perpendicular to the second reference line R2. Each of the first division wall 29a and the second division wall 29b couples the portion of the rotor core 20 positioned on the first magnet 41 side with respect to the second mount hole 22 and the portion of the rotor core 20 positioned on the opposite side of the second mount hole 22 from the first magnet 41.

The second mount hole 22 is divided, by the first division wall 29a and the second division wall 29b, into three divided holes aligned in the direction in which the second reference line R2 extends. That is, the second magnet 42 is divided, by the first division wall 29a and the second division wall 29b, into three magnet pieces aligned in the direction in which the second reference line R2 extends.

Each of the dimension of a portion of the first magnet 41 positioned between the reference point P and the first division wall 29a in the magnetization direction and the dimension of a portion of the first magnet 41 positioned between the reference point P and the second division wall 29b in the magnetization direction is greater than the dimension of the other portions of the first magnet 41 in the magnetization direction.

Specifically, the first magnet 41 has three thin portions 44 and two thick portions 45. The three thin portions 44 are separated from each other in the direction in which the first reference line R1 extends. Each thick portion 45 is located between adjacent ones of the thin portions 44 in the direction in which the first reference line R1 extends. One of the two thick portions 45 is positioned on a virtual line S1 connecting the reference point P and the first division wall 29a, and the other thick portion 45 is positioned on a virtual line S2 connecting the reference point P and the second division wall 29b.

Specifically, the protrusion 46 includes a first protrusion 46c and a second protrusion 46d separated from each other in the direction in which the second reference line R2 extends. The first protrusion 46c is a portion of the first magnet 41 crossing the virtual line S1. The first protrusion 46c protrudes to the reference point P. The second protrusion 46d is a portion of the first magnet 41 crossing the virtual line S2. The second protrusion 46d protrudes to the reference point P. Portions of the first magnet 41 including the first protrusion 46c and the second protrusion 46d are the thick portions 45.

In this example, the two division walls which are the first division wall 29a and the second division wall 29b are disposed, and the magnetic fluxes of the stator 6 passing through the reference point P pass through each of the first division wall 29a and the second division wall 29b. Thus, also in this example, the magnetic fluxes of the stator 6 are less likely to pass through the second magnet 42, and demagnetization of the second magnet 42 caused by the diamagnetic field is less likely to occur. The portion of the first magnet 41 between the reference point P and the first division wall 29a has the dimension in the magnetization direction, which is greater than the dimension of the other portions in the magnetization direction, and has a high permeance modulus. Thus, demagnetization of the first magnet 41 caused by the diamagnetic field due to the magnetic fluxes of the stator 6 passing through the first division wall 29a can be prevented. Similarly, the portion of the first magnet 41 between the reference line R and the second division wall 29b has the dimension in the magnetization direction, which is greater than the dimension of the other portions in the magnetization direction, and has a high permeance modulus. Thus, demagnetization of the first magnet 41 caused by the diamagnetic field due to the magnetic fluxes of the stator 6 passing through the second division wall 29b can be prevented.

Figure 8:
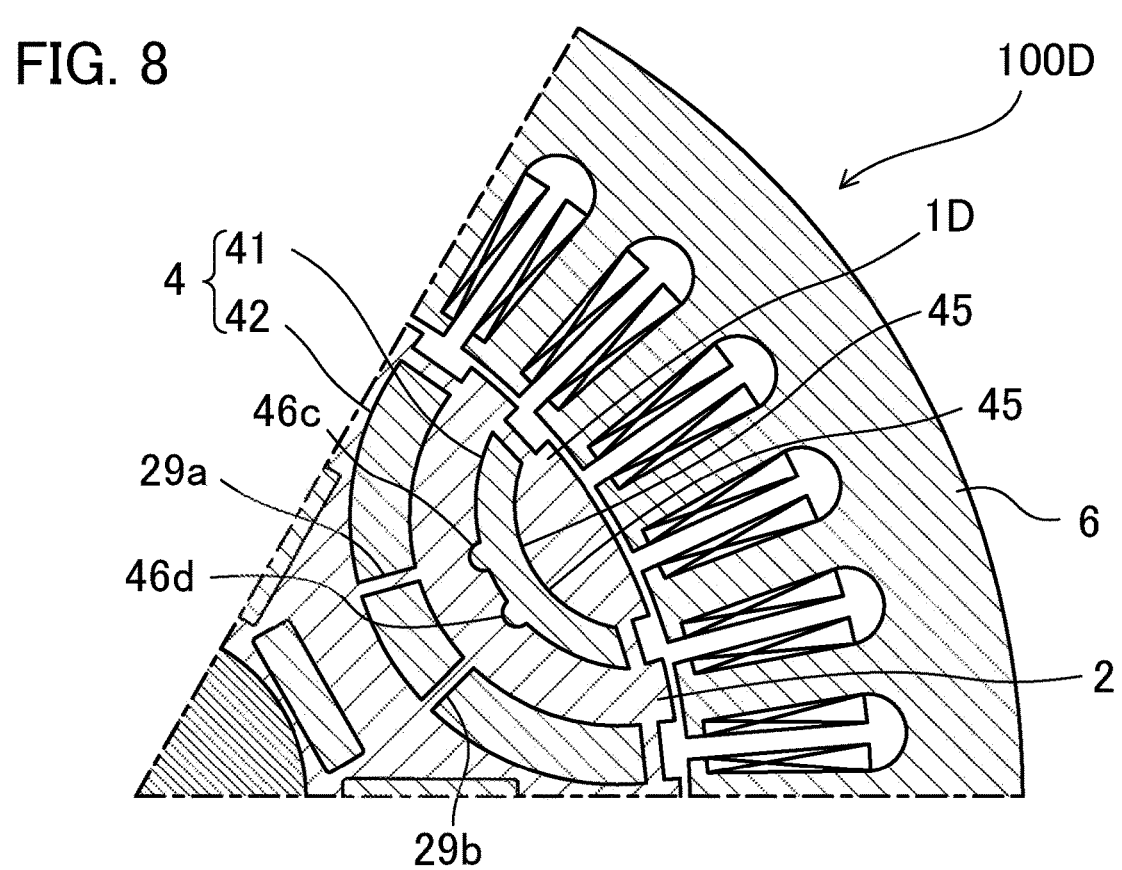
FIG. 8 is an enlarged sectional view of a motor of a fourth modification.

FIG. 8 is an enlarged sectional view of the motor 100D including a rotor 1D in the fourth modification. A basic configuration of the rotor 1D of this example is the same as that of the rotor 1C of the third modification. Note that in this example, the first protrusion 46c protrudes to the first division wall 29a and the second protrusion 46d protrudes to the second division wall 29b.

Figure 9:
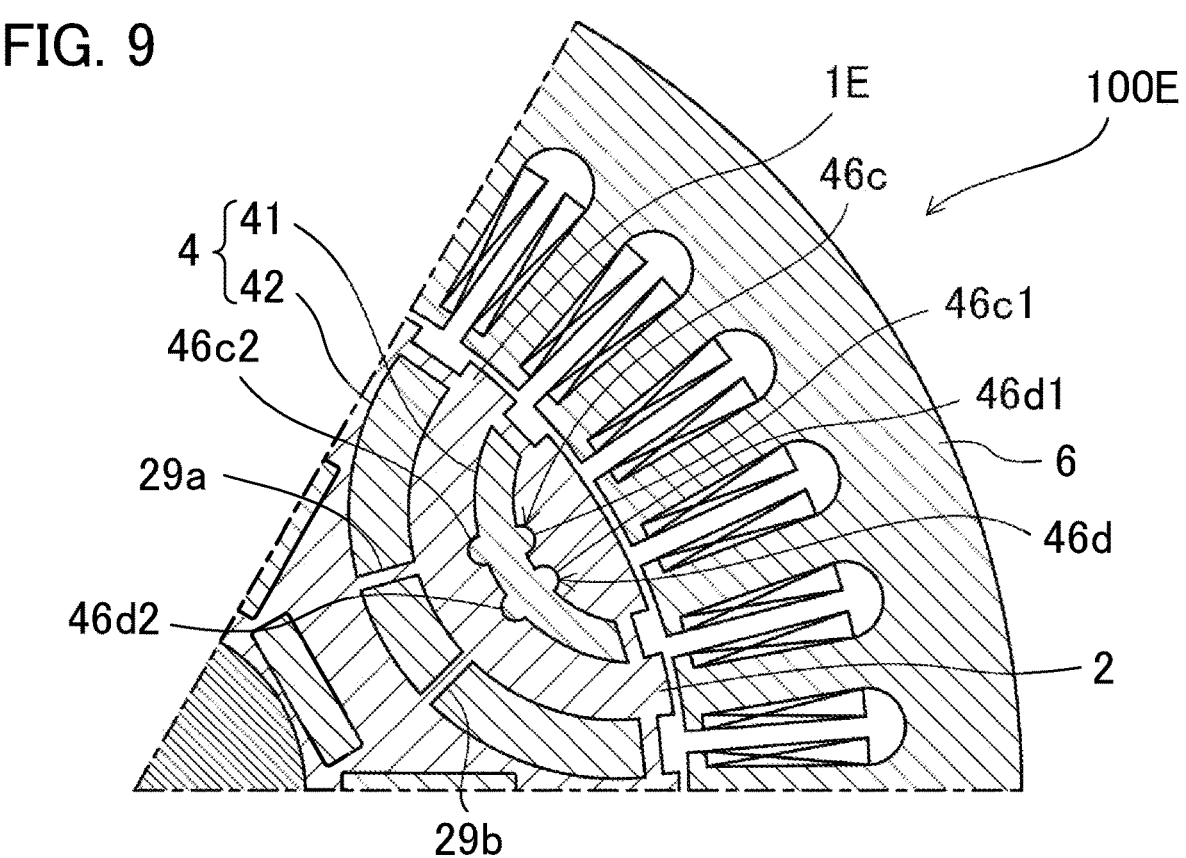
FIG. 9 is an enlarged sectional view of a motor of a fifth modification.

FIG. 9 is an enlarged sectional view of the motor 100E including a rotor 1E in the fifth modification. A basic configuration of the rotor 1E of this example is the same as that of the rotor 1C of the third modification. Note that in this example, the first protrusion 46c includes an outward protrusion 46c1 protruding to the reference point P and an inward protrusion 46c2 protruding to the first division wall 29a. Moreover, the second protrusion 46d includes an outward protrusion 46d1 protruding to the reference point P and an inward protrusion 46d2 protruding to the first division wall 29a.

Figure 10:
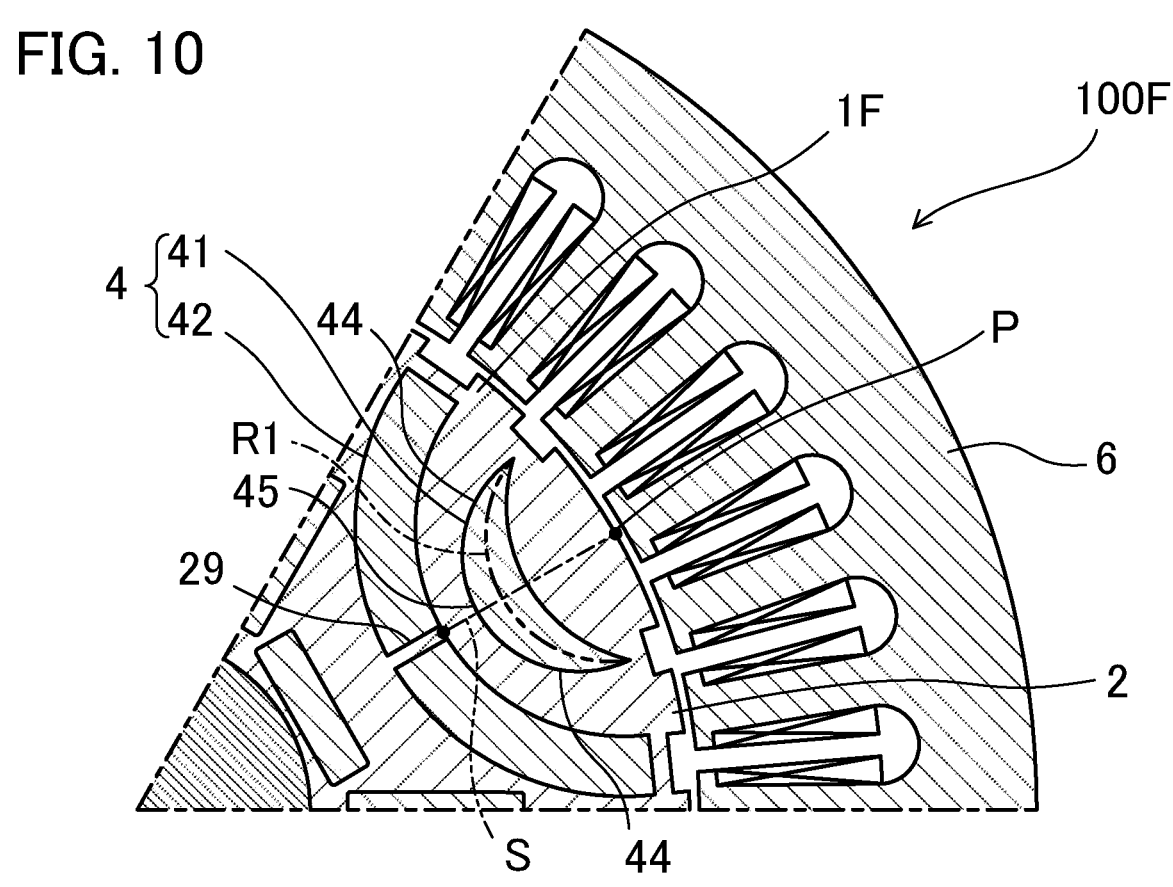
FIG. 10 is an enlarged sectional view of a motor of a sixth modification.

FIG. 10 is an enlarged sectional view of the motor 100F including a rotor 1F in the sixth modification. In this example, the first magnet 41 includes no protrusion 46, and the dimension of the first magnet 41 in the magnetization direction continuously decreases to both ends of the first magnet 41 from the portion of the first magnet 41 crossing the virtual line S in the direction in which the first reference line R1 extends. Here, "continuously decreases" means that the dimension of the first magnet 41 in the magnetization direction gradually decreases with a constant change rate or gradually decreases in a non-stepwise manner. Note that in this example, each boundary between the thick portion 45 and the thin portion 44 is not clearly shown on the appearance, but a center portion of the first magnet 41 including the portion crossing the virtual line S is the thick portion 45 and both side portions of the first magnet 41 sandwiching the thick portion 45 are the thin portions 44.

Figure 11:
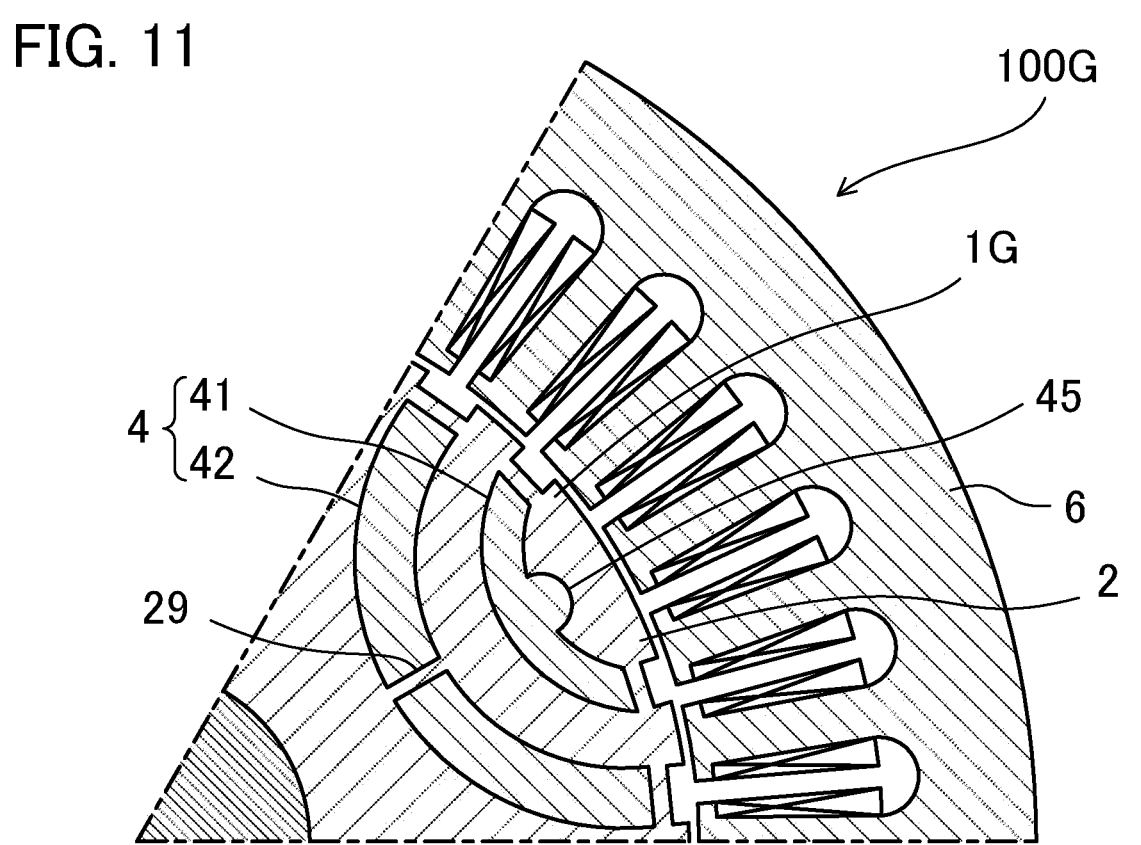
FIG. 11 is an enlarged sectional view of a motor of a seventh modification.

FIG. 11 is an enlarged sectional view of the motor 100G including a rotor 1G in the seventh modification. In this example, the rotor 1G includes no auxiliary magnets 5a, 5b.

Figure 12:
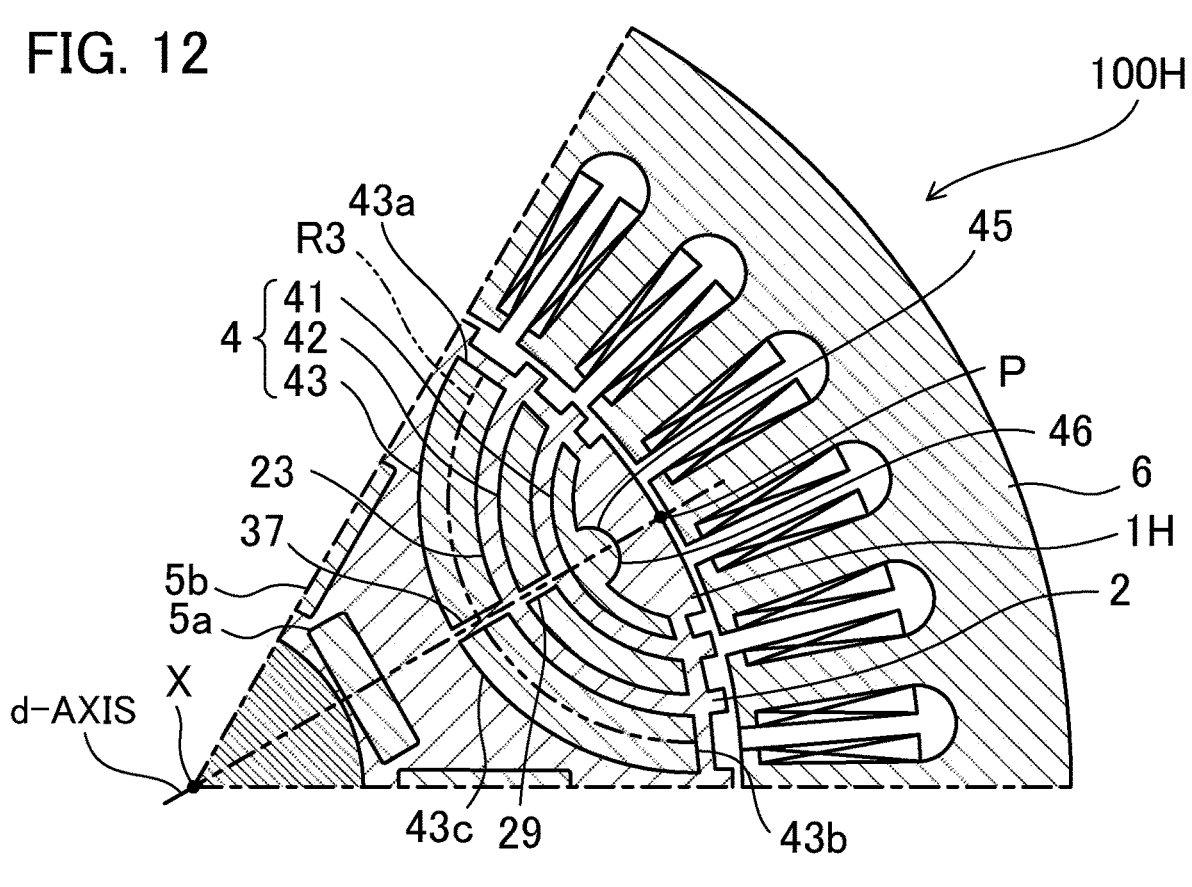
FIG. 12 is an enlarged sectional view of a motor of an eighth modification.

FIG. 12 is an enlarged sectional view of the motor 100H including a rotor 1H in the eighth modification. In this example, the magnetic pole portion 4 includes a third magnet 43 in addition to the first magnet 41 and the second magnet 42.

The third magnet 43 is located on the radial inside with respect to the second magnet 42 in the rotor core 20. The third magnet 43 is in the form of a layer. That is, the magnetic pole portion 4 has three magnet layers of the first magnet 41, the second magnet 42, and the third magnet 43.

The third magnet 43 is a bonded magnet. The magnet material of the third magnet 43 is the same as the magnet materials of the first magnet 41 and the second magnet 42, for example. The rotor core 20 includes third mount holes 23 in each of which the third magnet 43 is to be located. The third mount hole 23 is a hole penetrating the rotor core 20 in the rotation axis direction. The sectional shape of the third mount hole 23 is the same as the sectional shape of the third magnet 43. The third magnet 43 is a cured product of the magnet material charged into the third mount hole 23 of the rotor core 20.

The third magnet 43 is in a plate shape extending along the rotation axis X. The sectional shape of the third magnet 43 is the same across the entire length of the first magnet 41 in the rotation axis direction. The sectional shape of the third magnet 43 is a linear shape. That is, the sectional shape of the third magnet 43 is a shape extending along a predetermined third reference line R3.

The third magnet 43 has two end portions 43a, 43b in a direction in which the third reference line R3 extends and a middle portion 43c positioned between the two end portions 43a, 43b. Note that the middle portion 43c does not indicate the entirety of a portion of the third magnet 43 other than the two end portions 43a, 43b and indicates at least part of the portion other than the two end portions 43a, 43b. The middle portion 43c may or may not include the center of the third magnet 43 in the direction in which the third reference line R3 extends. In the third magnet 43, a direction which is parallel with a plane perpendicular to the rotation axis X and is perpendicular to the third reference line R3 will also be referred to as a "thickness direction."

The third magnet 43 is curved or bent so as to be recessed to the radial inside. The middle portion 43c is positioned on the radial inside with respect to the two end portions 43a, 43b. That is, the third magnet 43 is curved or bent such that the two end portions 43a, 43b are closer to the outer peripheral surface 28 of the rotor core 20 than the middle portion 43c is to the outer peripheral surface 28. Specifically, the third magnet 43 is substantially in a U-shape. That is, the third magnet 43 is in an arc shape curved so as to be recessed to the radial inside. The sectional shape of the third magnet 43 is a line-symmetric shape with respect to a symmetrical axis extending in the radial direction.

The third magnet 43 is magnetized in a direction crossing the third reference line R3. Specifically, the third magnet 43 is magnetized in a direction which is parallel with a plane perpendicular to the rotation axis X and is perpendicular to the third reference line R3. That is, the magnetization direction of the third magnet 43 is the thickness direction of the third magnet 43.

The rotor core 20 further has division walls 37 each of which divides the third mount hole 23. The division wall 37 is located at a center portion of the third mount hole 23 in the direction in which the third reference line R3 extends. The division wall 37 couples a portion of the rotor core 20 positioned on the second magnet 42 side with respect to the third mount hole 23 and a portion of the rotor core 20 positioned on the opposite side of the third mount hole 23 from the second magnet 42.

The division wall 37 is positioned on the d-axis of the magnetic pole portion 4. The division wall 37 extends in a direction crossing the third reference line R3, more specifically a direction perpendicular to the third reference line R3, in the perpendicular section. The third mount hole 23 is divided, by the division wall 37, into two divided holes aligned in the direction in which the third reference line R3 extends. The third magnet 43 is divided, by the division wall 37, into two magnet pieces aligned in the direction in which the third reference line R3 extends. The thick portion 45 of the first magnet 41 is positioned between the division wall 37 and the reference point P. That is, in the perpendicular section, the thick portion 45, the division wall 29, and the division wall 37 are located on the same line.

The dimension of the third magnet 43 in the magnetization direction is constant in the direction in which the third reference line R3 extends. The average of the dimension of the third magnet 43 in the magnetization direction is greater than the average of the dimension of the second magnet 42 in the magnetization direction. Note that the average of the dimension of the third magnet 43 in the magnetization direction may be the same as the average of the dimension of the second magnet 42 in the magnetization direction or may be less than the average of the dimension of the second magnet 42 in the magnetization direction.

In this example, the rotor body 2 includes the division walls 37 each of which divides the third mount hole 23. Thus, the magnetic fluxes of the stator 6 are more likely to pass through the division walls 37, and are less likely to pass through the third magnets 43. Thus, demagnetization of the third magnets 43 caused by the diamagnetic field due to the magnetic fluxes of the stator 6 can be prevented.

Figure 13:
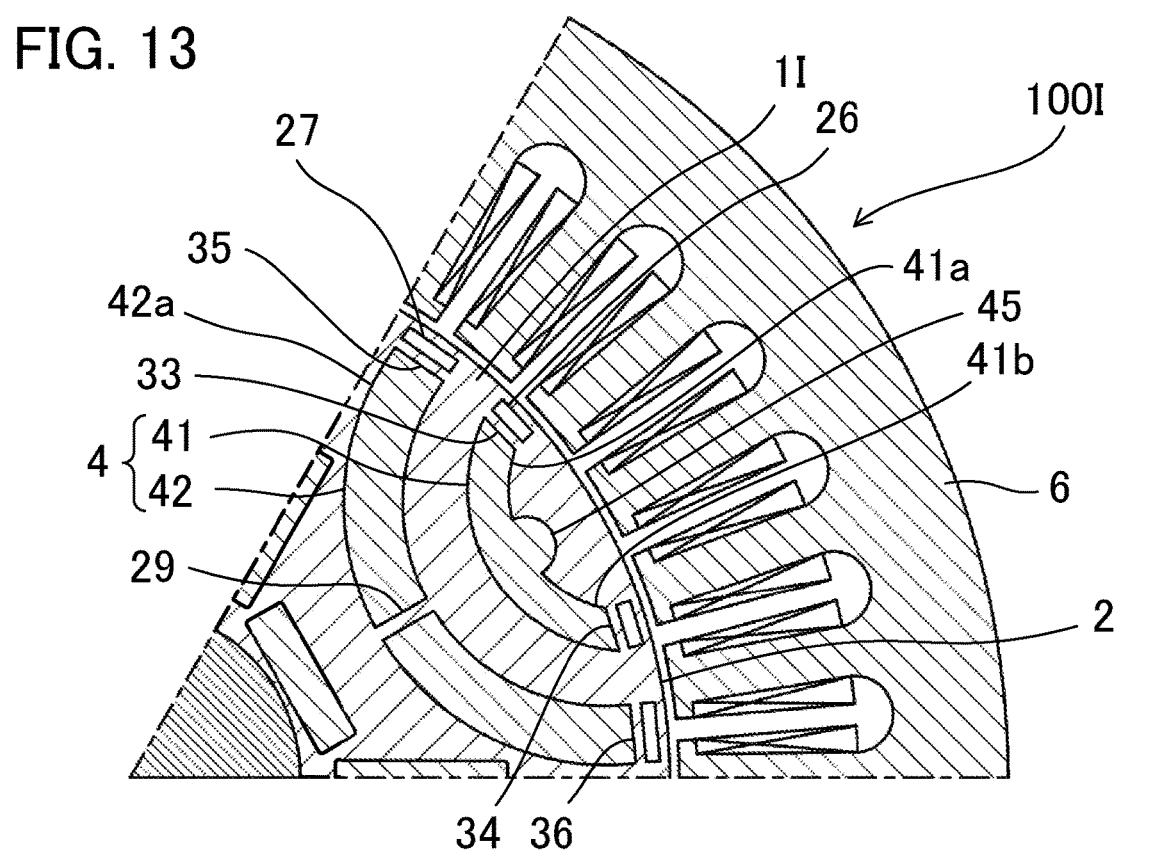
FIG. 13 is an enlarged sectional view of a motor of a ninth modification.

FIG. 13 is an enlarged sectional view of the motor 100I including a rotor 1I in the ninth modification. In this example, the rotor body 2 includes holes 26, 27 instead of the cutouts 24, 25. As in the cutouts 24, 25, the holes 26, 27 reduce demagnetization of each of the first and second magnets 41, 42 caused by the diamagnetic field due to the stator 6.

Figure 14:
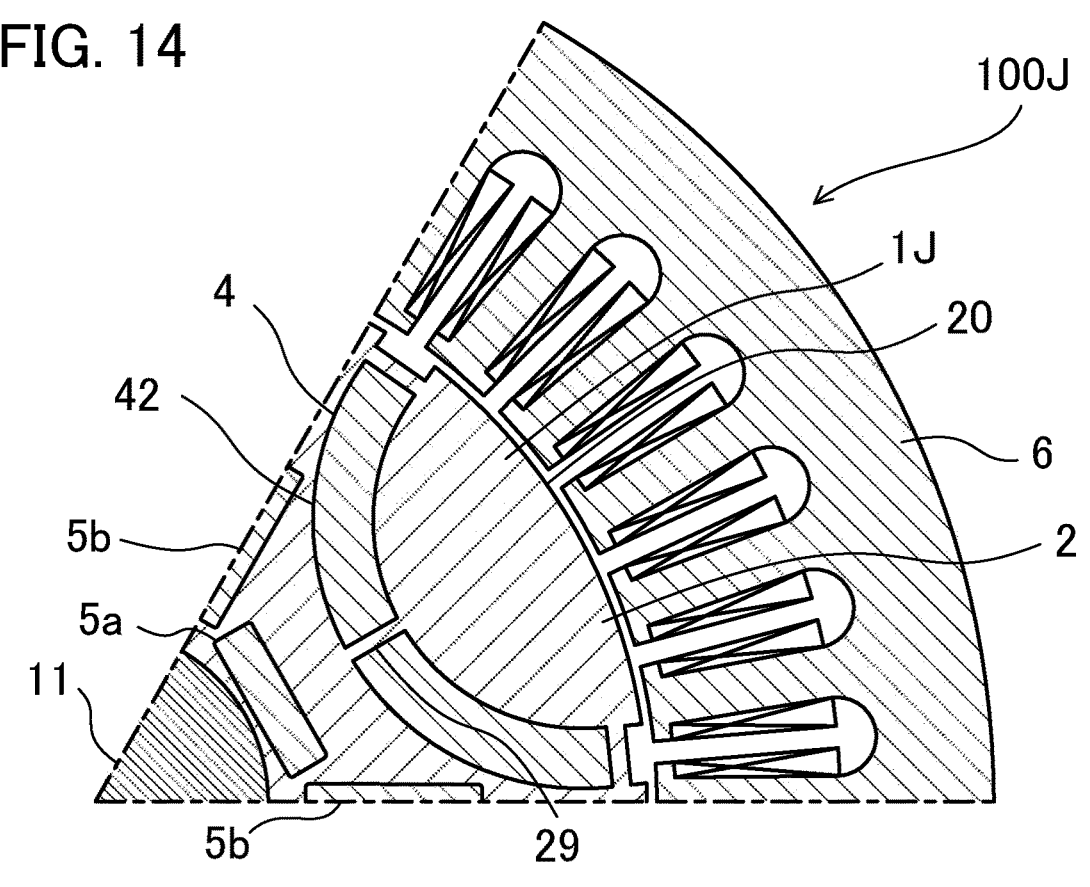
FIG. 14 is an enlarged sectional view of a motor of a tenth modification.

FIG. 14 is an enlarged sectional view of the motor 100J including a rotor 1J in the tenth modification. In this example, the magnetic pole portion 4 has only the second magnet 42 of the first magnet 41 and the second magnet 42. That is, the magnetic pole portion 4 has only one magnet layer of the second magnet 42. In this example, the magnetic fluxes of the auxiliary magnets 5a, 5b passing through the division walls 29 contribute to generation of the magnet torque, and can improve the torque of the motor 100.

Figure 15:
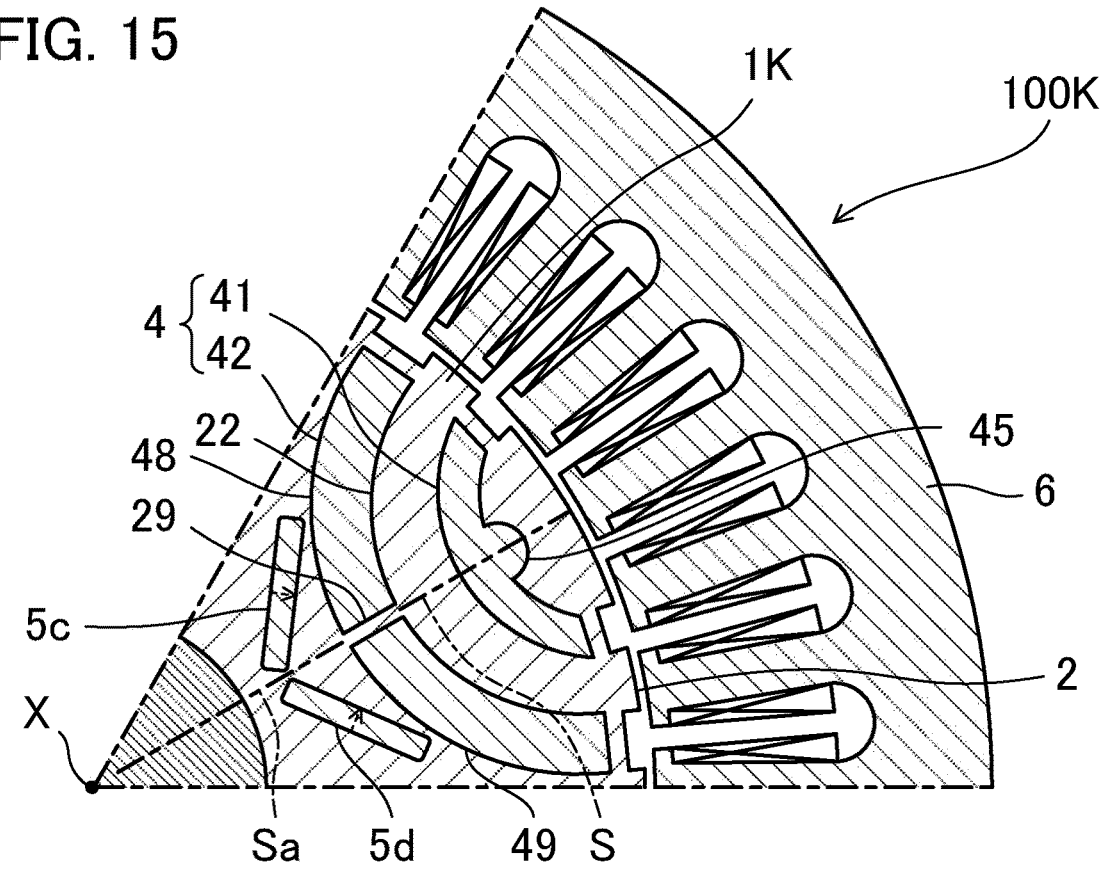
FIG. 15 is an enlarged sectional view of a motor of an eleventh modification.

FIG. 15 is an enlarged sectional view of the motor 100K including a rotor 1K in the eleventh modification. In this example, the rotor 1K includes auxiliary magnets 5c, 5d instead of the auxiliary magnets 5a, 5b. One auxiliary magnet 5c and one auxiliary magnet 5d are disposed for each magnetic pole portion 4. That is, the rotor 1K includes six auxiliary magnets 5c and six auxiliary magnets 5d. The auxiliary magnets 5c, 5d are located between the second magnet 42 and the rotation axis X. Specifically, the auxiliary magnet 5c is located between the magnet piece 48 and the rotation axis X. The auxiliary magnet 5d is located between the magnet piece 49 and the rotation axis X. The auxiliary magnet 5c and the auxiliary magnet 5d are aligned in the circumferential direction. The auxiliary magnet 5c and the auxiliary magnet 5d are located apart from each other with the extension Sa of the virtual line S therebetween in the circumferential direction.

The auxiliary magnets 5c, 5d are bonded magnets. The auxiliary magnets 5c, 5d are made of the same material as those of the first magnet 41 and the second magnet 42, for example. As in the auxiliary magnets 5a, 5b, the auxiliary magnets 5c, 5d are obtained in such a manner that the magnet material to be the bonded magnets is injected into the mold housing the rotor core 20.

The sectional shape of the auxiliary magnet 5c, 5d is the same across the entire length of the auxiliary magnet 5c, 5d in the rotation axis direction. The sectional shape of the auxiliary magnet 5c, 5d is a shape extending apart from the extension Sa in the circumferential direction as extending to the radial outside. That is, an interval in the circumferential direction between the auxiliary magnet 5c and the auxiliary magnet 5d increases to the radial outside. Specifically, the sectional shape of the auxiliary magnet 5c, 5d is a rectangular shape having a longitudinal direction crossing the radial direction and the circumferential direction. Part of the auxiliary magnet 5c, 5d is located between the second magnets 42 of adjacent ones of the magnetic pole portions 4 in the circumferential direction. Moreover, part of the auxiliary magnet 5c, 5d is located inside the corresponding magnetic pole portion 4 in the radial direction. The auxiliary magnet 5c, 5d is magnetized in a direction perpendicular to the longitudinal direction of the auxiliary magnet 5c, 5d as indicated by a dashed arrow in FIG. 15.

The magnetic fluxes of the auxiliary magnet 5c, 5d pass through the portion of the rotor core 20 positioned on the first magnet 41 side with respect to the second mount hole 22, the division wall 29, and the portion of the rotor core 20 positioned on the opposite side of the second mount hole 22 from the first magnet 41. That is, the auxiliary magnet 5c, 5d is also magnetized such that the amount of magnetic fluxes passing through the division wall 29 increases. In this example, the magnetic fluxes of the auxiliary magnet 5c, 5d passing through the division wall 29 contribute to generation of the magnet torque, and the torque of the motor 100 can be improved.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

The rotor body 2 does not necessarily include the shaft 11, and may include only the rotor core 20. The rotor body 2 does not necessarily include the rotor core 20, and may include only the shaft 11. The shaft 11 is not necessarily the soft magnetic material. The shaft 11 may be integrated with the rotor core 20.

The rotor core 20 may have four or more division walls 29. That is, the second magnet 42 may be divided at three or more locations in the direction in which the second reference line R2 extends, and the second magnet 42 may have four or more magnet pieces. In this case, the first magnet 41 may be configured such that the dimension of a portion between the reference point P and each division wall in the magnetization direction is greater than the dimension of other portions in the magnetization direction.

The number of magnetic pole portions 4 in the rotor 1 is not limited. The number of magnet layers in the magnetic pole portion 4 is not limited. The magnetic pole portion 4 may include four or more magnet layers. The d-axis of the magnetic pole portion 4 is not necessarily coincident with the center axis of the shape of the magnetic pole portion 4. The q-axis of the magnetic pole portion 4 does not necessarily pass through the center between adjacent ones of the magnetic pole portions 4 in the circumferential direction in the perpendicular section.

Each of the first magnet 41 and the second magnet 42 may be an anisotropic bonded magnet or an isotropic bonded magnet. Each of the first magnet 41 and the second magnet 42 may be a sintered magnet obtained by sintering of magnetic powder.

The sectional shape of each of the first magnet 41 and the second magnet 42 is not limited. The sectional shape of each of the first magnet 41 and the second magnet 42 may be, for example, a V-shape or a W-shape. The symmetrical axis of the first magnet 41 is not necessarily coincident with the d-axis of the magnetic pole portion 4. The symmetrical axis of the second magnet 42 is not necessarily coincident with the d-axis of the magnetic pole portion 4.

The number of thin portions 44 in the first magnet 41 is not limited. The dimension of the thin portion 44 in the magnetization direction is not necessarily constant. The number of thick portions 45 in the first magnet 41 is not limited. The dimension of the thick portion 45 in the magnetization direction may be constant in the direction in which the first reference line R1 extends.

The dimension t2 of the second magnet 42 in the magnetization direction is not necessarily constant. The dimension t2 of the second magnet 42 in the magnetization direction may be greater than the maximum value of the dimension of the first magnet 41 in the magnetization direction. The average of the dimension of the second magnet 42 in the magnetization direction may be less than the average of the dimension of the first magnet 41 in the magnetization direction, or may be the same as the average of the dimension of the first magnet 41 in the magnetization direction. The dimension of the second magnet 42 in the magnetization direction may change in the direction in which the second reference line R2 extends.

The auxiliary magnets 5a to 5d may be anisotropic bonded magnets or isotropic bonded magnets. The auxiliary magnets 5a to 5d may be sintered magnets obtained by sintering of magnetic powder. The shapes, positions, sizes, etc. of the auxiliary magnets 5a to 5d are not limited. The magnetization directions of the auxiliary magnets 5a to 5d are not limited as long as the amount of magnetic fluxes passing through the division wall 29 is increased by the auxiliary magnets 5a to 5d. Each of the rotors 1A to 1F, 1H to 1K of the first to sixth and eighth to eleventh modifications does not necessarily include the auxiliary magnets 5a to 5d.

At least either the portions 33, 34 of the rotor core 20 positioned outside the end portions 41a, 41b of each first magnet 41 or the portions 35, 36 of the rotor core 20 positioned outside the end portions 42*a*, 42*b* of each second magnet 42 is only required to include the cutouts 24, 25 or the holes 26, 27. The sectional shape of each of the cutouts 24, 25 and the holes 26, 27 is not limited, and for example, may be a triangular shape or a semicircular shape. The cutouts 24, 25 and the holes 26, 27 may be omitted.

The rotor 1, 1A to 1I, 1K of a first aspect of the technique of the present disclosure includes the rotor body 2 rotatable about the rotation axis X, and the magnetic pole portions 4 arranged in the circumferential direction centered on the rotation axis X in the rotor body 2 and having different magnetic poles alternately in the circumferential direction. Each magnetic pole portion 4 includes the first magnet 41 and the second magnet 42 located inside the first magnet 41 in the radial direction centered on the rotation axis X. The rotor body 2 includes the first mount holes 21 in each of which the first magnet 41 is to be located and the second mount holes 22 in each of which the second magnet 42 is to be located. The rotor body 2 has the division walls 29 each of which divides the second mount hole 22 so as to couple the portion of the rotor body 2 positioned on the first magnet 41 side with respect to the second mount hole 22 and the portion of the rotor body 2 positioned on the opposite side of the second mount hole 22 from the first magnet 41 to each other. The first mount hole 21 is one undivided hole. When the intersection of the outer peripheral surface of the rotor body 2 with the d-axis of each magnetic pole portion 4 is taken as the reference point P, the dimension t1*a* of the portion of the first magnet 41 positioned between the reference point P and the division wall 29 in the magnetization direction is greater than the dimension t1*b* of the other portions of the first magnet 41 in the magnetization direction.

According to this configuration, the magnetic fluxes of the stator 6 are more likely to pass through the division walls 29, and are less likely to pass through the second magnets 42 located in the second mount holes 22. Thus, demagnetization of the second magnets 42 caused by the diamagnetic field can be reduced. Moreover, the dimension t1*a* of the portion of the first magnet 41 positioned between the reference point P and the division wall 29 in the magnetization direction is greater than the dimension t1*b* of the other portions of the first magnet 41 in the magnetization direction so that the permeance modulus of such a portion can be enhanced. Thus, demagnetization of the first magnets 41 caused by the diamagnetic field due to the magnetic fluxes of the stator 6 can be prevented. Further, the first mount hole 21 is one undivided hole so that the volume of the first magnet 41 located in the first mount hole 21 can be increased and the magnet torque can be improved. Consequently, the torque of the motor 100 can be improved.

The rotor 1, 1A to 1E, 1G to 1I, 1K of a second aspect of the technique of the present disclosure is the rotor 1, 1A to 1E, 1G to 1I, 1K of the first aspect, in which the portion of the first magnet 41 positioned between the reference point P and the division wall 29 includes the protrusion 46 protruding to the reference point P or the division wall 29.

According to this configuration, only the portion of the first magnet 41 through which the magnetic fluxes passing through the division wall 29 are particularly likely to pass can be the portion with a great dimension in the magnetization direction. Consequently, an increase in the magnet amount of the first magnet 41 can be suppressed while demagnetization of the first magnet 41 caused by the diamagnetic field is prevented.

The rotor 1C to 1E of a third aspect of the technique of the present disclosure is the rotor 1C to 1E of the first or second aspect, in which the first magnet 41 is in the shape extending along the predetermined first reference line R1 in the section perpendicular to the rotation axis X, the second magnet 42 is in the shape extending along the predetermined second reference line R2 in the section perpendicular to the rotation axis X, the division wall 29 includes the first division wall 29*a* and the second division wall 29*b* separated from each other in the direction in which the second reference line R2 extends, each of the first division wall 29*a* and the second division wall 29*b* couples the portion positioned on the first magnet 41 side with respect to the second mount hole 22 and the portion positioned on the opposite side of the second mount hole 22 from the first magnet 41 to each other, and each of the dimension of the portion of the first magnet 41 positioned between the reference point P and the first division wall 29*a* in the magnetization direction and the dimension of the portion of the first magnet 41 positioned between the reference point P and the second division wall 29*b* in the magnetization direction is greater than the dimension of the other portions of the first magnet 41 in the magnetization direction.

According to this configuration, the two division walls which are the first division wall 29*a* and the second division wall 29*b* are disposed, and therefore, the magnetic fluxes of the stator 6 are much less likely to pass through the second magnet 42 and demagnetization of the second magnet 42 caused by the diamagnetic field can be further reduced. Moreover, the dimension of the portion of the first magnet 41 between the reference point P and the first division wall 29*a* in the magnetization direction is greater so that the permeance modulus of such a portion can be enhanced and demagnetization caused by the diamagnetic field can be reduced. Similarly, the dimension of the portion of the first magnet 41 between the reference point P and the second division wall 29*b* in the magnetization direction is greater so that the permeance modulus of such a portion can be enhanced and demagnetization caused by the diamagnetic field can be reduced. Thus, demagnetization of the first magnet 41 caused by the diamagnetic field can be reduced.

The rotor 1, 1A to 1I, 1K of a fourth aspect of the technique of the present disclosure is the rotor 1, 1A to 1I, 1K of any one of the first to third aspects, in which the average of the dimension of the second magnet 42 in the magnetization direction is greater than the average of the dimension of the first magnet 41 in the magnetization direction.

According to this configuration, the thick portion 45 which is the portion of the first magnet 41 having a great dimension in the magnetization direction generates great magnetic resistance, and therefore, the permeance modulus of the portion of the second magnet 42 through which the magnetic fluxes passing through the thick portion 45 pass tends to be low. However, the average of the dimension of the second magnet 42 in the magnetization direction is greater so that the permeance modulus of the second magnet 42 can be enhanced and irreversible demagnetization of the second magnet 42 can be reduced. In addition, the average of the dimension of the first magnet 41 in the magnetization direction is less than the average of the dimension of the second magnet 42 in the magnetization direction so that the volume of the rotor body 2 can be increased and the reluctance torque generated by the rotor body 2 can be improved.

The rotor 1, 1A to 1F, 1H, 1I, 1K of a fifth aspect of the technique of the present disclosure is the rotor 1, 1A to 1F, 1H, 1I, 1K of any one of the first to fourth aspects, which further includes the auxiliary magnets 5*a* to 5*d* each of which is disposed inside the second magnet 42 in the radial direction or between the second magnets 42 of adjacent ones of the magnetic pole portions 4 in the circumferential direction in the rotor body 2 and increasing the amount of magnetic fluxes passing through the division wall 29.

In other words, the rotor 1, 1A to 1F, 1H to 1K includes the rotor body 2 rotatable about the rotation axis X and the second magnets 42 (magnets) arranged in the circumferential direction centered on the rotation axis X in the rotor body 2 and having different magnetic poles alternately in the circumferential direction. The rotor body 2 includes the second mount holes 22 (mount holes) in each of which the second magnet 42 is to be located. The rotor body 2 has the division walls 29 each of which divides the second mount hole 22 so as to couple the radial outside portion of the second mount hole 22 and the radial inside portion of the second mount hole 22 to each other. The auxiliary magnet 5a to 5d that increases the amount of magnetic fluxes passing through the division wall 29 is disposed inside the second magnet 42 in the radial direction or between adjacent ones of the second magnets 42 in the circumferential direction in the rotor body 2.

According to this configuration, the magnet torque can be improved by the auxiliary magnets 5a to 5d, and therefore, the torque of the motor 100 can be improved. Moreover, the auxiliary magnet 5b can be disposed using each space of the rotor body 2 between adjacent ones of the magnetic pole portions 4 in the circumferential direction, and an increase in the size of the rotor 1 can be suppressed.

The motor 100, 100A to 100I, 100K of a sixth aspect of the technique of the present disclosure includes the rotor 1, 1A to 1I, 1K of any one of the first to fifth aspects and the stator 6 that drives the rotor 1, 1A to 1I, 1K.

| DESCRIPTION OF REFERENCE CHARACTERS | |
| --- | --- |
| 100, 100A to 100K | Motor |
| 1, 1A to 1K | Rotor |
| 2 | Rotor Body |
| 21 | First Mount Hole |
| 22 | Second Mount Hole |
| 29 | Division Wall |
| 29a | First Division Wall |
| 29b | Second Division Wall |
| 4 | Magnetic Pole Portion |
| 41 | First Magnet |
| 42 | Second Magnet |
| 5a to 5d | Auxiliary Magnet |
| 6 | Stator |
| t1a | Dimension |
| t1b | Dimension |
| t2 | Dimension |
| P | Reference Point |
| R1 | First Reference Line |
| R2 | Second Reference Line |
| X | Rotation Axis |

The invention claimed is:

1. A rotor comprising:
a rotor body rotatable about a rotation axis; and
magnetic pole portions arranged in a circumferential direction centered on the rotation axis in the rotor body and having different magnetic poles alternately in the circumferential direction, wherein:
each magnetic pole portion includes a first magnet and a second magnet located inside the first magnet in a radial direction centered on the rotation axis,
the rotor body includes a first mount hole in which the first magnet is to be located and a second mount hole in which the second magnet is to be located, the rotor body has a division wall dividing the second mount hole so as to couple a portion of the rotor body positioned on a first magnet side with respect to the second mount hole and a portion of the rotor body positioned on an opposite side of the second mount hole from the first magnet to each other,
the first mount hole is one undivided hole,
when an intersection of an outer peripheral surface of the rotor body with a d-axis of each magnetic pole portion is taken as a reference point, a dimension of a portion of the first magnet positioned between the reference point and the division wall in a magnetization direction is greater than a dimension of other portions of the first magnet in the magnetization direction,
the first magnet is in a shape extending along a predetermined first reference line in a section perpendicular to the rotation axis,
the second magnet is in a shape extending along a predetermined second reference line in the section perpendicular to the rotation axis,
the division wall includes a first division wall and a second division wall separated from each other in a direction in which the second reference line extends,
each of the first division wall and the second division wall couples the portion positioned on the first magnet side with respect to the second mount hole and the portion positioned on the opposite side of the second mount hole from the first magnet to each other, and
each of a dimension of a portion of the first magnet positioned between the reference point and the first division wall in the magnetization direction and a dimension of a portion of the first magnet positioned between the reference point and the second division wall in the magnetization direction is greater than a dimension of other portions of the first magnet in the magnetization direction.

2. The rotor of claim 1, wherein
the portion of the first magnet positioned between the reference point and the division wall includes a protrusion protruding to the reference point or the division wall.

3. The rotor of claim 1, wherein
an average of a dimension of the second magnet in the magnetization direction is greater than an average of a dimension of the first magnet in the magnetization direction.

4. A motor comprising:
the rotor of claim 1; and
a stator that drives the rotor.

5. A rotor comprising:
a rotor body rotatable about a rotation axis; and
magnetic pole portions arranged in a circumferential direction centered on the rotation axis in the rotor body and having different magnetic poles alternately in the circumferential direction, wherein:
each magnetic pole portion includes a first magnet and a second magnet located inside the first magnet in a radial direction centered on the rotation axis,
the rotor body includes a first mount hole in which the first magnet is to be located and a second mount hole in which the second magnet is to be located,
the rotor body has a division wall dividing the second mount hole so as to couple a portion of the rotor body positioned on a first magnet side with respect to the second mount hole and a portion of the rotor body positioned on an opposite side of the second mount hole from the first magnet to each other, the first mount hole is one undivided hole, when an intersection of an outer peripheral surface of the rotor body with a d-axis of each magnetic pole portion is taken as a reference point, a dimension of a portion of the first magnet positioned between the reference point and the division wall in a magnetization direction is greater than a dimension of other portions of the first magnet in the magnetization direction, and:

the rotor further comprises:

a first auxiliary magnet disposed inside the second magnet in the radial direction in the rotor body and increasing an amount of a magnetic flux passing through the division wall; and a second auxiliary magnet disposed between the second magnets of adjacent ones of the magnetic pole portions in the circumferential direction in the rotor body and increasing an amount of a magnetic flux passing through the division wall, wherein the sectional shape of the first auxiliary magnet is a rectangular shape having a longitudinal direction crossing the radial direction, the first auxiliary magnet is magnetized in the radial direction, and wherein the sectional shape of the second auxiliary magnet is a rectangular shape having a longitudinal direction coincident with the radial direction, the second auxiliary magnet is magnetized in the circumferential direction.

6. The rotor of claim 5, wherein the portion of the first magnet positioned between the reference point and the division wall includes a protrusion protruding to the reference point or the division wall.

7. The rotor of claim 5, wherein an average of a dimension of the second magnet in the magnetization direction is greater than an average of a dimension of the first magnet in the magnetization direction.

8. A motor comprising:

the rotor of claim 5; and a stator that drives the rotor.

* * * * *